US012740544B1

(12) United States Patent
Dehney, Jr.

(10) Patent No.: US 12,740,544 B1
(45) Date of Patent: Sep. 22, 2026

(54) PET CARRIER WITH OPENINGS FOR FACILITATING CONTACT BETWEEN HUMAN AND ANIMAL

(71) Applicant: Robert Jude Dehney, Jr., Alameda, CA (US)

(72) Inventor: Robert Jude Dehney, Jr., Alameda, CA (US)

(*) Notice: Subject to any disclaimer, the term of this patent is extended or adjusted under 35 U.S.C. 154(b) by 0 days.

(21) Appl. No.: 19/297,864

(22) Filed: Aug. 12, 2025

Related U.S. Application Data

(60) Provisional application No. 63/816,162, filed on Jun. 2, 2025.

(51) Int. Cl.
*A01K 1/02* (2006.01)
*A01K 1/03* (2006.01)

(52) U.S. Cl.
CPC ............ *A01K 1/0245* (2013.01); *A01K 1/031* (2013.01)

(58) Field of Classification Search
CPC .. A01K 1/0236; A01K 1/0245; A01K 1/0254; A01K 1/033; A01K 1/031
See application file for complete search history.

(56) References Cited

U.S. PATENT DOCUMENTS 4,788,934 A * 12/1988 Fetter .................. A01K 1/0353 D30/114
4,852,520 A 8/1989 Goetz
4,977,875 A 12/1990 Kumagai et al.
6,155,206 A 12/2000 Godshaw
6,394,035 B1* 5/2002 Hill ........................ A01K 1/035 119/482
6,699,228 B1 3/2004 Chmielewski et al.
9,392,766 B1 7/2016 Elden
10,016,252 B1 7/2018 Wren, Sr.
11,678,642 B2 6/2023 Lin et al.
2006/0207517 A1 9/2006 Mirsky
2006/0213452 A1* 9/2006 King .................... A01K 1/0245 119/496
2008/0245312 A1* 10/2008 Leung .................. A01K 1/0245 119/497
2018/0206446 A1 7/2018 Mirsky et al.

(Continued)

FOREIGN PATENT DOCUMENTS

CN 113424771 A * 9/2021 ........... A01K 1/0245
CN 118182603 A * 6/2024 ............... A01K 1/02
KR 20240002023 U * 12/2024 ........... A01K 1/0254

*Primary Examiner* — Joshua D Huson
*Assistant Examiner* — Alanna K Peterson
(74) *Attorney, Agent, or Firm* — Lucas & Mercanti, LLP; Jonathan A. Tyler

(57) ABSTRACT

A pet carrier includes a side having a first opening and a structure covering the first opening. The structure includes a panel attached to the side of the carrier and a collapsible barrier extending between the panel and the side of the carrier. A second opening is located in the collapsible barrier. The structure has a closed position in which the panel covers the first opening, and the collapsible barrier is in a folded position, and an open position in which the unattached edges of the panel are separated from the carrier at an angle and the collapsible barrier is in an extended position. The first and second openings are adapted to enable a user to insert a hand from the exterior of the pet carrier through the structure into the interior of the carrier when the structure is in the open position.

8 Claims, 17 Drawing Sheets

(56) References Cited

U.S. PATENT DOCUMENTS

| | | | | |
|---|---|---|---|---|
| 2019/0183088 | A1 | 6/2019 | Yang | |
| 2023/0309504 | A1* | 10/2023 | Murray | A01K 1/0245 119/498 |
| 2025/0017168 | A1 | 1/2025 | Guajaca | |

* cited by examiner 110
175
170
180
105
103
114
117
119
110
110
170
105
103
114
117
119
110

PET CARRIER WITH OPENINGS FOR FACILITATING CONTACT BETWEEN HUMAN AND ANIMAL

CROSS-REFERENCE TO RELATED APPLICATION

This application claims the benefit of U.S. provisional application Ser. No. 63/816,162, filed Jun. 2, 2025, the entire content of which is incorporated by reference herein.

FIELD OF THE INVENTION

The specification relates generally to pet carriers, and more specifically to pet carriers with openings for facilitating contact between humans and animals.

BACKGROUND

Pet carriers are widely used to transport animals for a variety of reasons. A pet carrier is typically a container designed to safely transport one or more animals. A pet carrier may have a door or other opening that allow an animal to enter and exit the container, and smaller openings designed to provide ventilation.

Many pet owners use pet carriers to transport their pets, for example, while travelling, changing residences, or taking their pet to the veterinarian. If the owner travels on an airplane or train, the pet carrier may be placed in a designated area of the vehicle that is separated from the human passengers, during the duration of the trip. More typically, pet carriers must remain beneath the seat in front of the owner or may alternatively be placed on the owner's lap.

SUMMARY

In accordance with an embodiment, a pet carrier includes a body adapted to hold one or more animals, the body having at least a bottom, a first side, a second side opposite the first side, a first end, and a second end opposite the first end. The pet carrier also includes a first opening located on the first side adapted to allow passage of a hand of a user into the interior of the body, and a structure covering the opening. The structure includes a panel formed of a first material, the panel having a plurality of edges, wherein at least a first edge among the plurality of edges is attached to the first side of the body and one or more second edges among the plurality of edges are not connected to the first side of the body, a collapsible barrier formed of a second material different from the first material, the collapsible barrier being attached to the one or more second edges and attached to the first side of the body, the collapsible barrier extending between the one or more second edges of the panel and the first side of the body, and a second opening located in the collapsible barrier, wherein the second opening is horizontally displaced by a distance relative to the first opening. The panel has a closed position in which the panel covers the first opening, and the collapsible barrier is in a folded position, and an open position in which the panel is disposed at a first non-zero angle relative to the first side of the body and the collapsible barrier is in an extended position. The second opening is adapted to allow passage of the hand of the user from an exterior of the pet carrier to the first opening when the panel is in the open position.

In one or more embodiments, the first material includes at least one of plastic, rubber, wood, or fabric. The second material may include one of neoprene, fabric, rubber, EPDM rubber, silicone, or mesh.

In one or more embodiments, the panel is attached to the first side of the pet carrier by one of: a hinge, one or more buttons, stitching, sew-on snaps, press studs, rivets, or hydraulic or manual cylinders.

In some embodiments, the first side of the pet carrier includes one of a wire outline, foam, plastic, rubber, or fabric. The first side of the pet carrier may include a section formed of one of neoprene, fabric, mesh, elastic material, cloth, or synthetic sherpa, and the first opening may be disposed in the section.

In one or more embodiments, the second opening is vertically displaced by a second distance relative to the first opening. The intersection of a first line passing between a first center of the first opening and a second center of the second opening when the panel is in the open position and a second, horizontal line forms an angle between fifteen (15) degrees and sixty (60) degrees.

In some embodiments, the structure further includes a system having a first device adapted to releasably secure the panel in a closed position, and a second device adapted to cause the panel to move from the closed position to an open position in response to the first device releasing the panel from the closed position.

In another embodiment, the structure further includes a system adapted to cause the panel to move from an open position to a closed position in response to a first force applied to the panel and cause the panel to move from the closed position to an open position in response to a second force applied to the panel.

In one or more embodiments, a system employs a push-to-open roller latch including a receiving element attached to the panel and a latch device attached to the first side of the body, the latch device including a roller adapted to engage with the receiving element. In response to the first force applied to the panel, the roller engages with the receiving element. In response to the second force applied to the panel, the roller disengages from the receiving element.

In another embodiment, the structure includes a system adapted to enable the panel to move among a closed position and a plurality of open positions, each of the plurality of open positions corresponding to a respective angle formed by the panel and the first side, and to hold the panel in a selected one of the plurality of open positions.

In an embodiment, the system includes a spring plunger disposed on the first side, and an element connected to the panel, the element having a plurality of apertures, each aperture adapted to receive the spring plunger.

In accordance with another embodiment, a pet carrier includes a body adapted to hold one or more animals, the body having at least a bottom, a first side, a second side opposite the first side, a first end, and a second end opposite the first end. The first side includes a first opening adapted to allow passage of a hand of a user into an interior of the body, a track element that surrounds at least a first portion of the first opening, an annular element engaged with and adapted to rotate within the track element, wherein the annular element surrounds at least a second portion of the first opening, and a structure attached to the annular element, wherein the structure covers at least the second portion of the first opening, wherein the structure is adapted to rotate with the annular element. The structure includes a panel formed of a first material, the panel having a plurality of edges, wherein at least a first edge among the plurality of edges is attached to the annular element and one or more second edges among the plurality of edges are not connected to the annular element, a collapsible barrier formed of a second material different from the first material, the collapsible barrier being attached to the one or more second edges of the panel and attached to the annular element, the collapsible barrier extending between the one or more second edges of the panel and the annular element, and a second opening located in the collapsible barrier, wherein the second opening is horizontally displaced by a distance relative to the first opening. The panel has a closed position in which the panel covers the first opening, and the collapsible barrier is in a folded position, and an open position in which the panel is disposed at a first non-zero angle relative to the first side of the body and the collapsible barrier is in an extended position. The second opening is adapted to allow passage of the hand of the user from an exterior of the pet carrier to the first opening when the panel is in the open position.

In one or more embodiments, the annular element includes an inner circumference defining a central region and a third material extending within the central region, and the first opening is located in the third material.

In another embodiment, the first side of the pet carrier is formed from a third material in a region proximate to the track element. The track element is disposed on the third material, and the first opening is formed in the third material.

In some embodiments, the track element includes one or more fixing devices adapted to secure the annular element in a selected rotational position. The one or more fixing devices may include at least one of a slide lock, a pin lock, or a surface level stopper.

In other embodiments, the first material includes at least one of plastic, rubber, wood, or fabric. The second material may include neoprene, fabric, rubber, EPDM rubber, silicone, or mesh. The panel may be attached to the annular element by a hinge, one or more buttons, stitching, sew-on snaps, press studs, rivets, or hydraulic or manual cylinders.

Figure 1A:
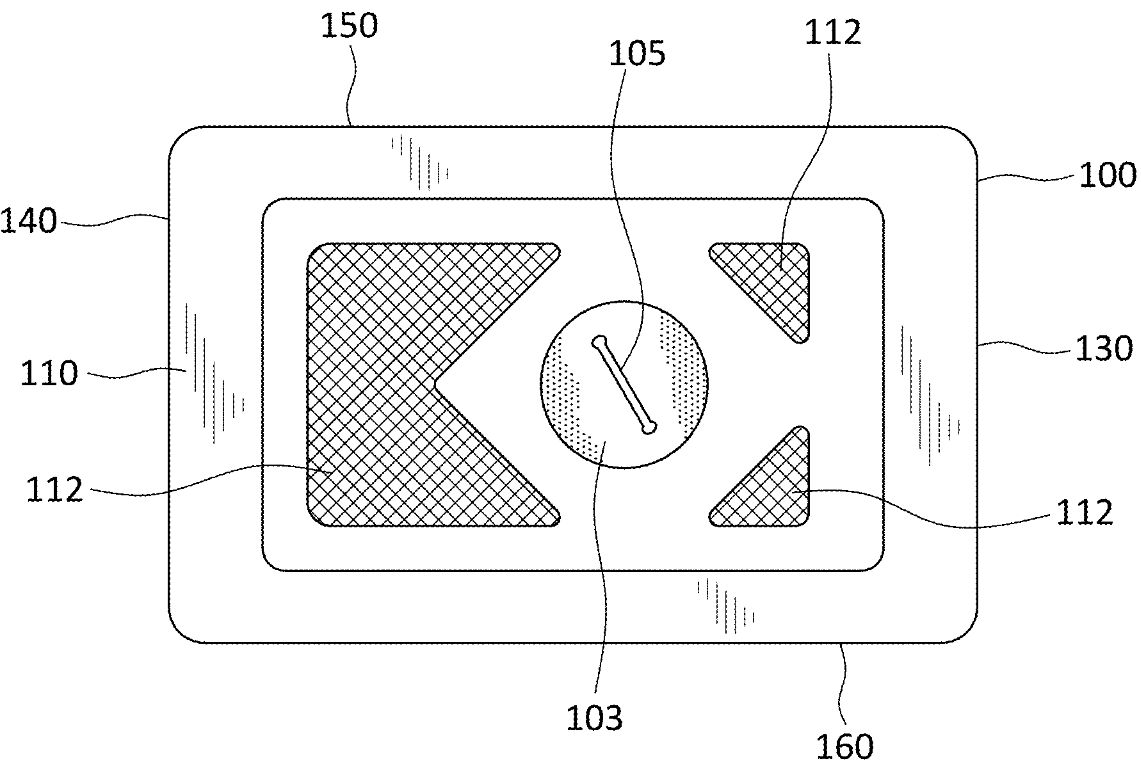
FIG. 1A shows a side view of a pet carrier in accordance with an embodiment.

These and other advantages of the present disclosure will be apparent to those of ordinary skill in the art by reference to the following Detailed Description and the accompanying drawings.

DETAILED DESCRIPTION

Pet carriers are widely used to transport animals for a variety of reasons. A pet carrier is typically a container designed to safely transport one or more animals. A pet carrier may have a door or other opening adapted to allow an animal to enter and exit the container, and smaller openings designed to provide ventilation.

Many pet owners use pet carriers to transport their pets, for example, while travelling or when changing residences. If the owner travels on an airplane, the pet carrier must be able to fit under the seat in front of the owner, or alternatively will be kept in the cargo hold. Accordingly, many owners prefer carriers that can be brought into the airplane cabin with them. In trains, the carrier must generally fit either within the passenger's own space or in the designated storage space associated with that seat.

Existing pet carriers are designed to keep an animal inside the carrier safe; however, existing pet carriers do not facilitate in-transit contact between the owner and pet. Indeed, the designs of many existing pet carriers make it very difficult for the owner to have any physical contact with the animal while the animal is in the carrier and the carrier is closed. There exists a particular dearth of existing pet carriers that allow for the extended contact that helps pets feel secure. The resulting lack of contact is associated with many disadvantages including increased stress and anxiety for both the animal inside the carrier and for the owner.

There is a need for a pet carrier that enables, encourages, and facilitates in-transit contact between owner and pet. The vast majority of commercially available pet carriers do not facilitate any in-transit contact between owner and pet. In order to make contact with the animal, pet owners must access the animal through the same doors or apertures used to place the pet into, or take the pet out of, the carrier. These openings are designed to facilitate ingress and egress. Opening one of these doors creates risk that the pet may at least attempt to escape. This risks a stressful situation in which the animal is exposed to stressful stimuli associated with public transportation, and the owner becomes anxious about their escaped animal, which is required to be kept within the carrier through the duration of the trip. As such, a pet carrier that allows secure contact between owner and animal represents an advance in the field. Further, to the extent pet carriers today allow for in-transit contact, they neither maximize the pet's comfort nor the pet owner's comfort during that interaction. Indeed, entry doors are often sealed via zipper. Zippers achieve predictable and quick closure of the entry aperture but are ill-suited to extended contact with a human hand or wrist, as contact between a person's skin and a zipper can cause discomfort.

One particular point of emphasis within the design of a pet carrier is persistent comfort for the pet's torso. The psychology of domesticated, social creatures is such that extended support to the torso promotes feelings of security and comfort, thereby reducing stress. Also, many humans rely on their pets for emotional support, comfort, or even distraction from the stressors of public transportation. Facilitating persistent, meaningful contact between pet and owner can also create in the animal more positive associations with the pet carrier, and with travel, than the animal might otherwise hold. Equally, pet owners may be more inclined to travel, or at least travel with their pet, if they can easily check-in on the animal and ensure their comfort through transit.

Advantageously, the inventive pet carrier disclosed herein includes features that enable, encourage, and facilitate in-transit contact between owner and pet.

In one or more embodiments, a pet carrier includes a first opening located on the side and a structure covering the first opening. The structure includes a panel attached to the side of the carrier and a collapsible barrier extending between the panel and the side of the carrier. A second opening is located in the collapsible barrier. The structure has a closed position in which the panel covers the first opening and the collapsible barrier is in a folded position, and an open position in which the unattached edges of the panel are separated from the carrier at an angle and the collapsible barrier is in an extended position. When the panel is in the open position, an enclosed volume is formed by the side of the carrier, the panel, and the collapsible barrier. The first and second openings are adapted to enable a user to insert a hand through the enclosed volume into the interior of the carrier.

FIG. 1A shows a side view of a pet carrier in accordance with an embodiment. Pet carrier 100 includes a first side 110, a top 150, a bottom 160, a first end 130, and a second end 140. In one or more embodiments, pet carrier 100, including first side 110, may include one or more materials including a wire outline, foam, plastic, rubber, fabric, etc. Other suitable materials may be used. Pet carrier 100 includes several sections formed of mesh that provide ventilation to ensure that an animal in the carrier can breathe.

First side 110 may include a section 103 formed of a flexible material such as neoprene, fabric, mesh, elastic material, cloth, synthetic sherpa, or another suitable material. Section 103 includes a first opening 105 adapted to allow a human hand to enter and exit carrier 100. In one embodiment, first opening 105 is formed by a slit in the flexible material of section 103. In another embodiment, first opening 105 is formed by two overlapping portions of the flexible material that can be separated to allow a human hand to pass between the two portions of material and into the carrier.

In other embodiments, first opening 105 is a round hole sufficiently large to receive a user's hand, and section 103 surrounding the hole may be formed of a soft material such as semi-soft plastic. In another embodiment, first opening 105 is formed via a less flexible material, which is attached to the base material of section 103, and which may take the shape of a slit, ellipse, rectangle, or oval. In another embodiment, first opening 105 may be a hole formed from any of the aforementioned materials and angled inwards such that access from outside of the carrier is facilitated by a wider berth and access from inside of the carrier is limited by a narrower opening. In various embodiments, the hole may be formed by a metal or plastic ring, or wiring, which may be covered with neoprene, fabric, rubber, EPDM rubber, silicone, mesh, or any other material soft enough to feel comfortable when contacted by the human hand or wrist.

In other embodiments, the part of first side 110 proximate first opening 105 is constructed of a uniform material and first opening 105 is located in the material of first side 110. In other embodiments, opening 105 is a hole defined by the absence of material in a region of first side 110.

In various embodiments, first opening 105 may have any orientation relative to carrier 100. In the preferred embodiment, first opening 105 is oriented vertically relative to carrier 100. Such orientation thereby ensures a vertical orientation relative to the animal as well. The animal would struggle to exit through a primarily vertical ellipse or rectangle. This is even more so the case because first opening 105 would generally be positioned between the animal's nape and rump. Additionally, this orientation ensures easiest access for the inserted human hand through the primary entry angles. However, first opening 105 may also take a more horizontal orientation, or may be any form of oval including a circle, thereby taking neither a vertical nor horizontal orientation. These orientations in turn facilitate entry of the human hand from other angles.

Figure 1B:
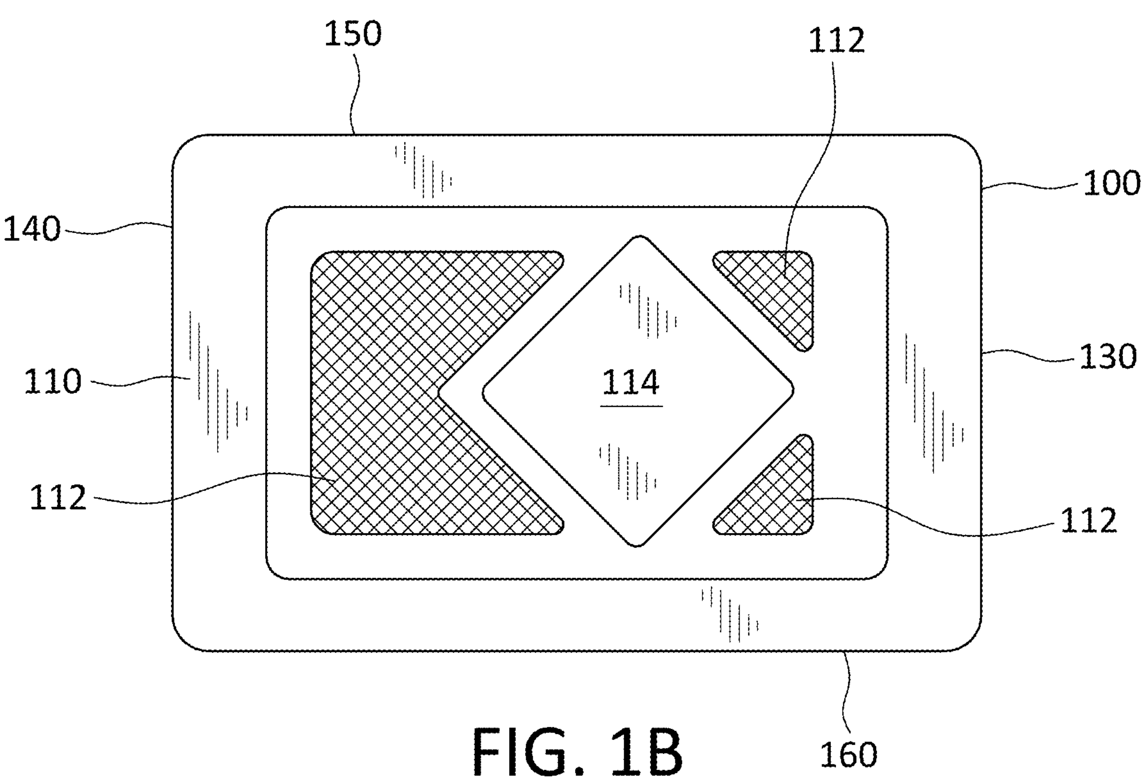
FIG. 1B shows a side view of a pet carrier in accordance with another embodiment.

FIG. 1B shows a side view of a pet carrier in accordance with another embodiment. Pet carrier 100 shown in FIG. 1B is similar to the carrier shown in FIG. 1A and further includes a panel 114 disposed on first side 110. Panel 114 covers section 103 and opening 105. At least one edge of panel 114 is attached to first side 110 of carrier 100.

In one or more embodiments, panel 114 is formed of a semi-rigid material. For example, in various embodiments, panel 114 may be formed of plastic, rubber, wood, or another suitable material. In another embodiment, panel 114 is formed of a combination of different materials. Panel 114 may include an additional layer of softer material such as fabric that covers all or part of the surface of panel 114.

Figure 1C:
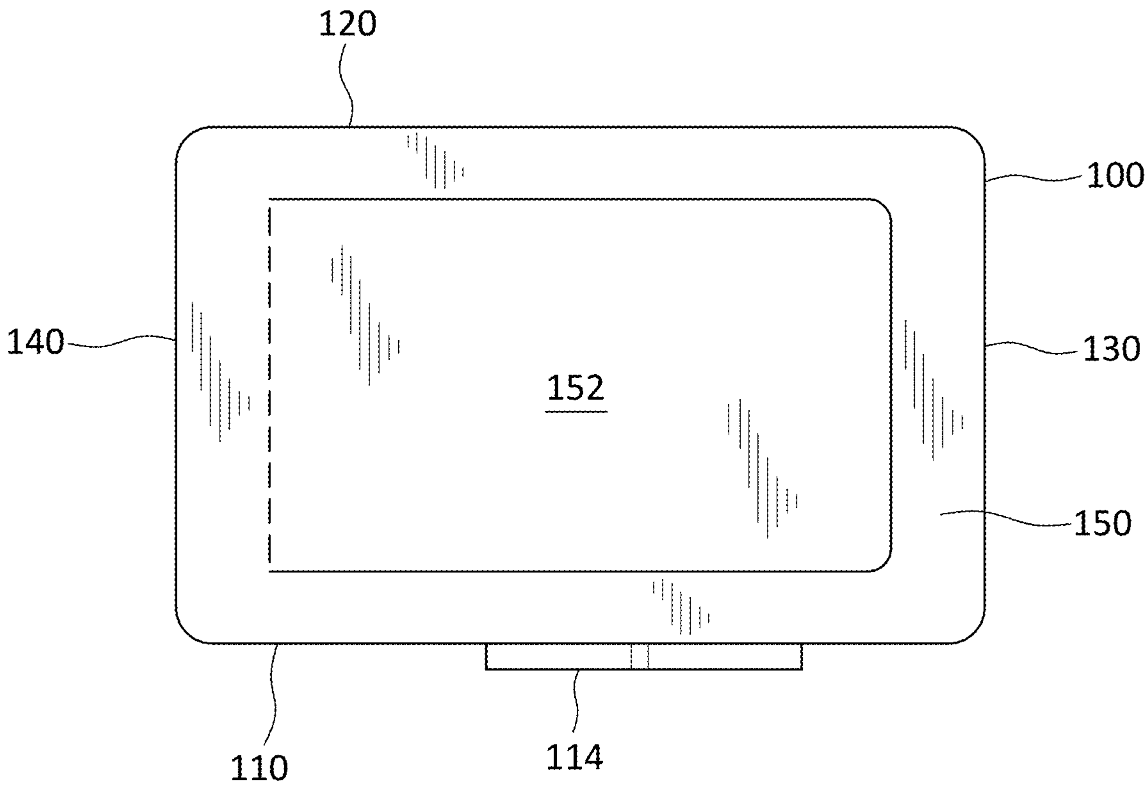
FIG. 1C shows a top view of the pet carrier of the embodiment of FIG. 1B, with a panel located on the side of the carrier in a closed position.

FIG. 1C shows a top view of the pet carrier of the embodiment of FIG. 1B. Top 150 includes a door 152 that may be opened to allow an animal to enter or exit carrier 100. For example, door 152 may be a section of material secured in place by a zipper or other type of fastener. When opened, door 152 provides an entrance/exit for the animal. The top view of pet carrier 100 as shown in FIG. 1C also provides a side view of panel 114.

Figure 1D:
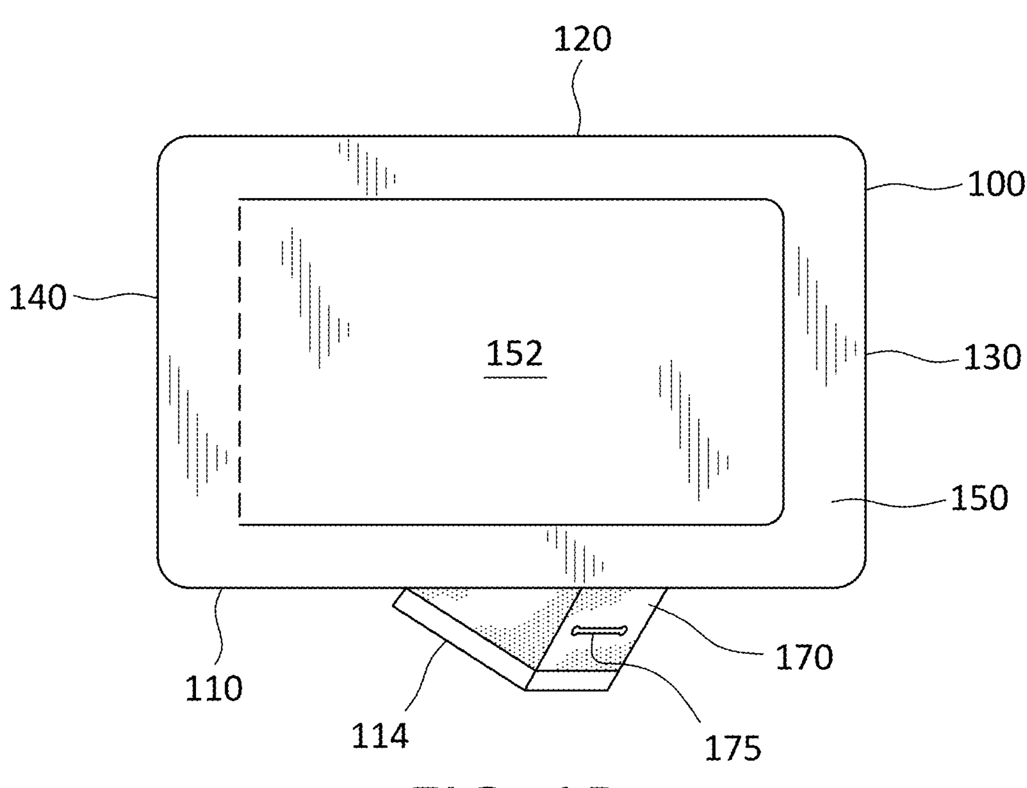
FIG. 1D shows a top view of the pet carrier of the embodiment of FIG. 1B, with the panel located on the side of the carrier in an open position.
Figure 1E:
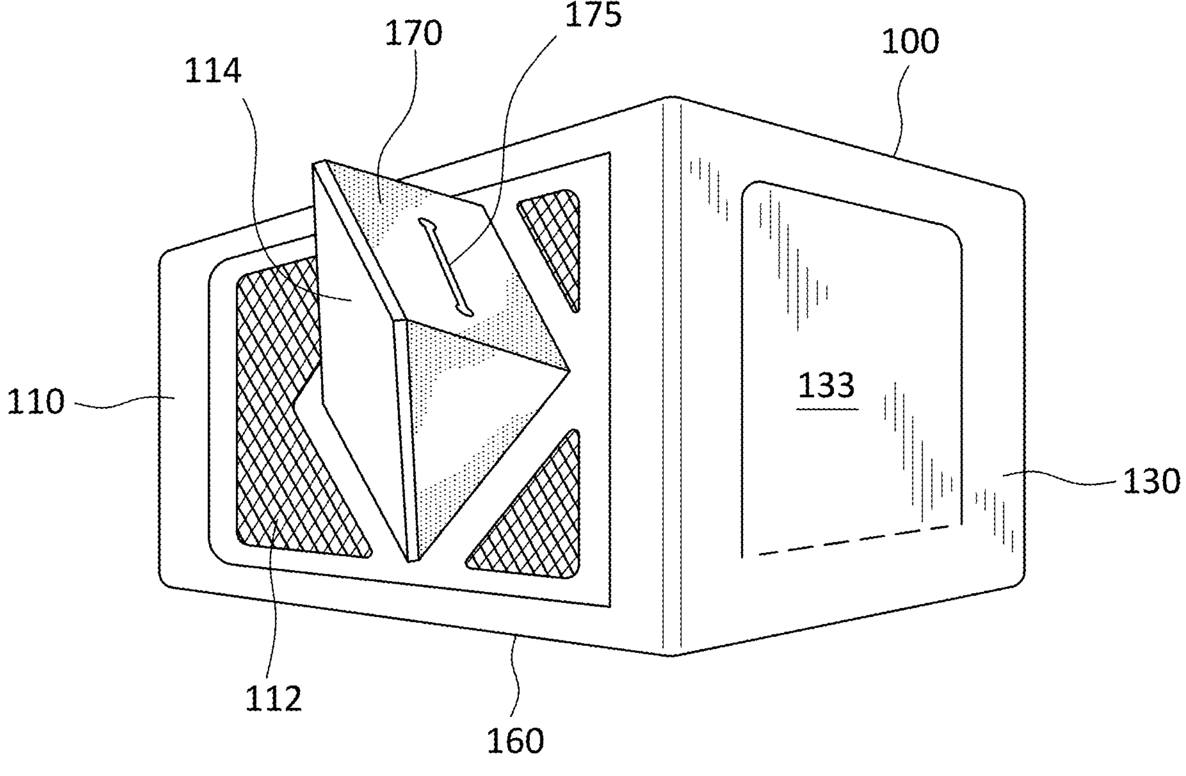
FIG. 1E shows a perspective view of the pet carrier of the embodiment of FIG. 1B, with the panel located on the side of the carrier in the open position.

In one or more embodiments, panel 114 is adapted to function in a manner similar to a door and moves between a closed position in which panel 114 covers section 103 and first opening 105 and an open position in which first opening 105 is accessible to a user's hand. FIG. 1D shows a top view of pet carrier 100 of the embodiment of FIG. 1B with panel 114 in the open position. FIG. 1E shows a perspective view of pet carrier 100 of the embodiment of FIG. 1B with panel 114 in the open position. An additional door 133 is disposed on first end 130 of carrier 100, providing an additional point of entry/exit for the animal.

In one or more embodiments, a collapsible barrier 170 extends between one or more edges of panel 114 and first side 110. For example, in one embodiment, a first edge of panel 114 is attached to first side 110 of carrier 100 and collapsible barrier 170 is connected to the remaining edges of panel 114. Collapsible barrier 170 extends from the edges of panel 114 to, and connects to, first side 110 of carrier 100. Collapsible barrier 170 may be attached to first side 110 of carrier 100 by any suitable method, such as by stitching. When panel 114 is in the open position, collapsible barrier 170 is in an extended position. Collapsible barrier 170 may be formed of any suitable material, such as, for example, a flexible material such as neoprene, fabric, rubber, EPDM rubber, silicone, mesh, etc. Other materials may be used.

In accordance with an embodiment, a second opening 175 is disposed in collapsible barrier 170. Second opening 175 may be formed by a slit in the material of collapsible barrier 170, or as an opening between two overlapping portions of material. Other structures or arrangements may be used to form second opening 175.

In various embodiments, second opening 175 may have any orientation relative to carrier 100. In one embodiment, second opening 175 runs parallel to the edge of panel 114. In other embodiments, second opening 175 may have other orientations.

Figures 1F, 1G:
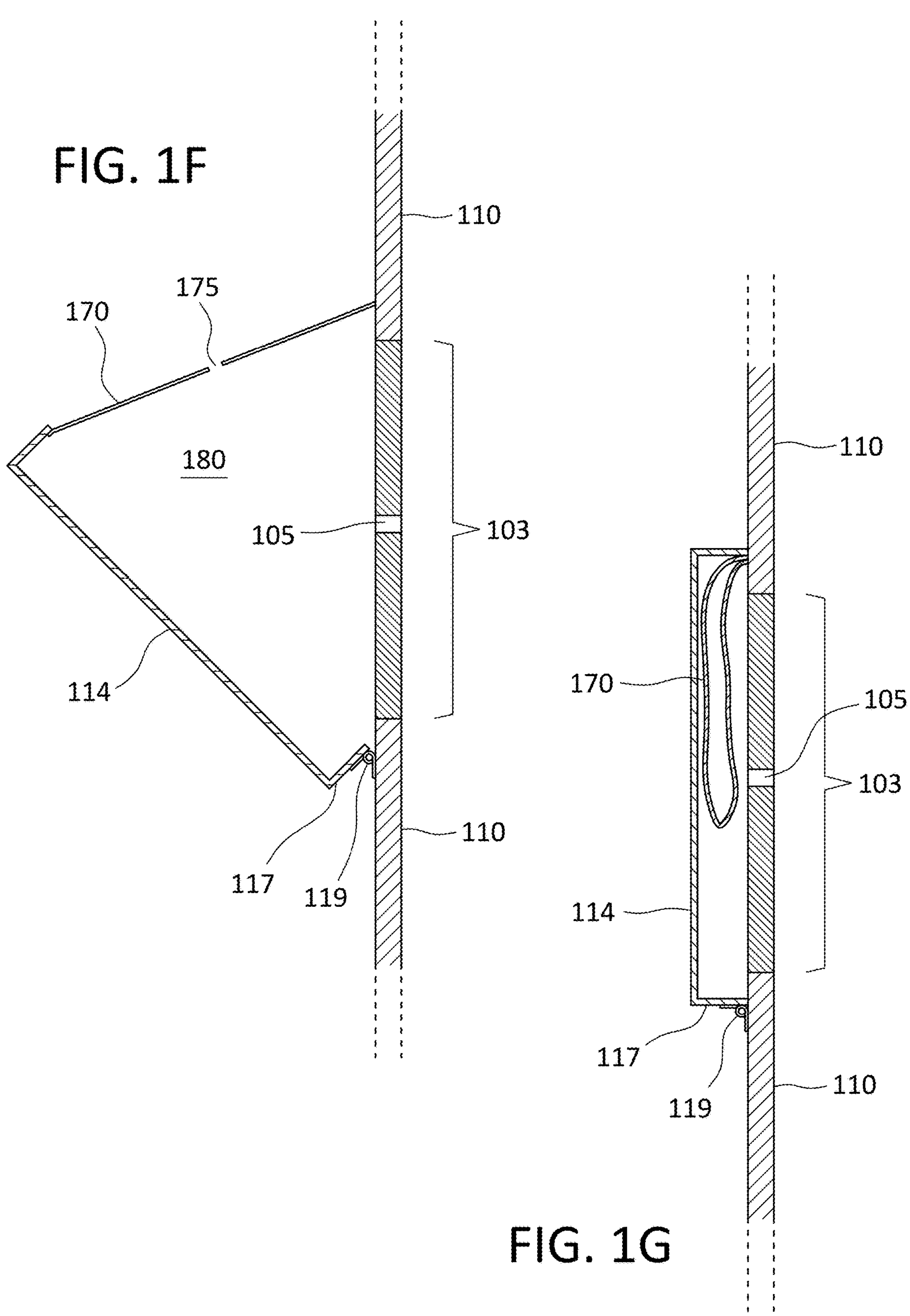
FIG. 1F shows a cross-sectional view of a side of a pet carrier and a panel in an open position in accordance with an embodiment.
FIG. 1G shows a cross-sectional view of the side of the pet carrier of the embodiment of FIG. F and the panel in a closed position.

When panel 114 is in the open position, panel 114, first side 110, and collapsible barrier 170 form an enclosed volume surrounded by panel 114, collapsible barrier 170, and carrier 100. FIG. 1F shows a cross-sectional view of first side 110 of a pet carrier 100, panel 114, and collapsible barrier 170, when panel 114 is in the open position, in accordance with an embodiment. Panel 114, first side 110 (including section 103), and collapsible barrier 170 define an enclosed volume 180.

In one or more embodiments, when panel 114 is in the closed position, collapsible barrier 170 folds or collapses into a folded position and remains between panel 114 and first side 110. FIG. 1G shows a cross-sectional view of first side 110 of pet carrier 100 of the embodiment of FIG. 1F and panel 114 in the closed position. Collapsible barrier 170 is folded in the folded position between panel 114 and first side 110.

Panel 114 may be attached to first side 110 of carrier 100 by any suitable mechanism. In accordance with an embodiment, panel 114 is attached to first side 110 by a hinge. Referring again to FIGS. 1F and 1G, a hinge 119 is attached to an edge 117 of panel 114 and to first side 110, enabling panel 114 to move between the open position and the closed position. In other embodiments, panel 114 may be attached to first side 110 of carrier 100 by other fastening mechanisms such as one or more buttons, pins, stitching, sew-on snaps, press studs, rivets, or hydraulic or manual cylinders, etc.

In one or more embodiments, panel 114 and/or first side 110 of carrier 100 may include a fixing mechanism for securing and maintaining panel 114 in the closed position when desired by the user. For example, the fixing mechanism may include, without limitation, one or more pieces of a hook-and-loop fasteners, one or more snaps, one or more straps, etc.

Figure 1H:
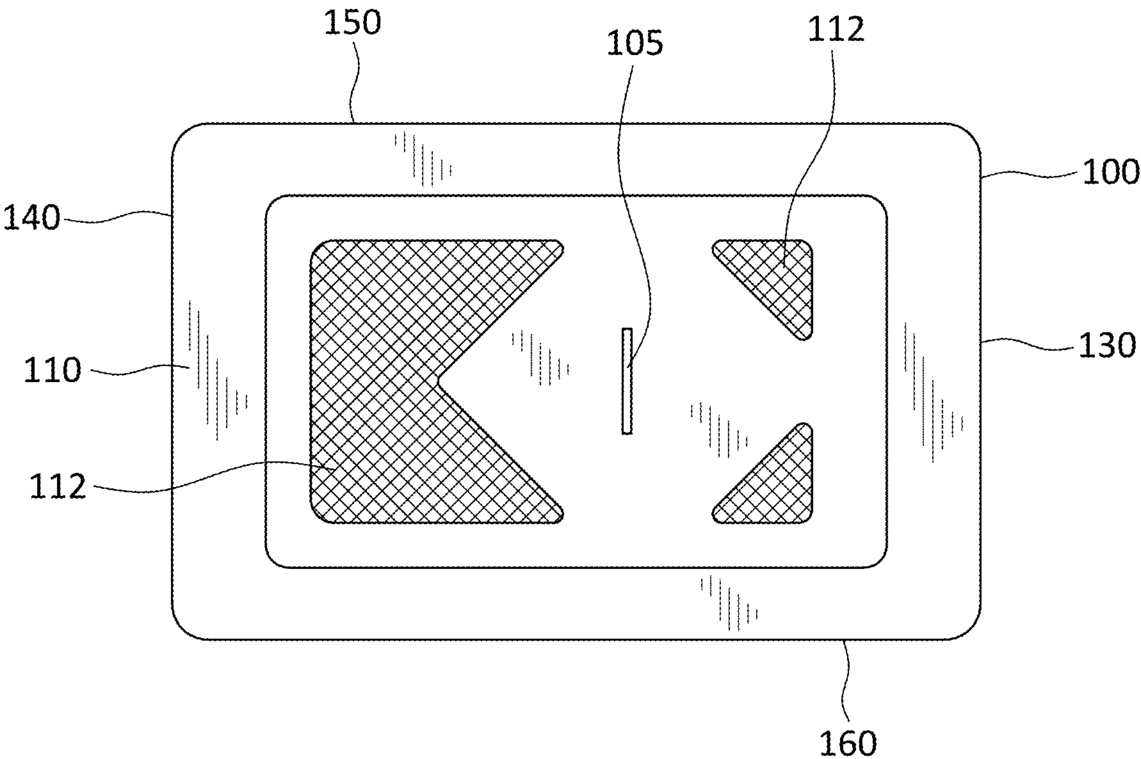
FIG. 1H shows a side view of a pet carrier in accordance with another embodiment.

FIG. 1H shows a pet carrier in accordance with another embodiment. Pet carrier 100 includes first side 110, top 150, bottom 160, first end 130, and second end 140. First side 110 includes mesh 112. Pet carrier 100 includes first opening 105 in first side but does not include a distinct section surrounding first opening 105 (such as section 103 of the embodiment of FIG. 1A). Instead, first side 110 is formed of a selected material in the region around mesh 112 and around first opening 105, and first opening 105 is formed in the selected material. First side 110 may include a structure including a panel and a collapsible barrier that covers first opening 105.

In one or more embodiments, panel 114 has an orientation in which first opening 105 and second opening 175 have relative positions that create advantages for both the user of pet carrier 100 and the animal inside the carrier. The orientations of first opening 105 and second opening 175 are discussed with reference to FIGS. 2A and 2B.

In one or more embodiments, second opening 175 is displaced horizontally and vertically relative to first opening 105. For example, second opening 174 may be displaced by between one (1) and six (6) inches horizontally and by between two (2) and six (6) inches vertically. Other displacements may be used. Advantageously, the displacement between first opening 105 and second opening 175 enables the enclosed volume 180 to function as a channel through which the user's hand passes in order to enter carrier 100 and contact the animal inside. Advantageously, in some embodiments, the channel thereby formed is parallel, or substantially parallel, to first side 110 of pet carrier 100 and is oriented at an angle between the horizontal and vertical that optimizes convenience for the user. The presence, shape, and orientation of the channel also makes it more difficult for an animal in the pet carrier to escape. Thus, advantageously, the channel thereby formed is both conducive to the shape of a flat human hand and limits the possibility of escape of a quadrupedal animal. In one or more embodiments, first opening 105 is located centrally along the length side of the carrier such that it would generally align with the enclosed animal's midsection, in between both sets of legs. In one of more embodiments, second opening 175 is located perpendicularly to the carrier at a position generally aligned with either end of the animal, on either side of both sets of legs. Other orientations may be used.

Figure 2A:
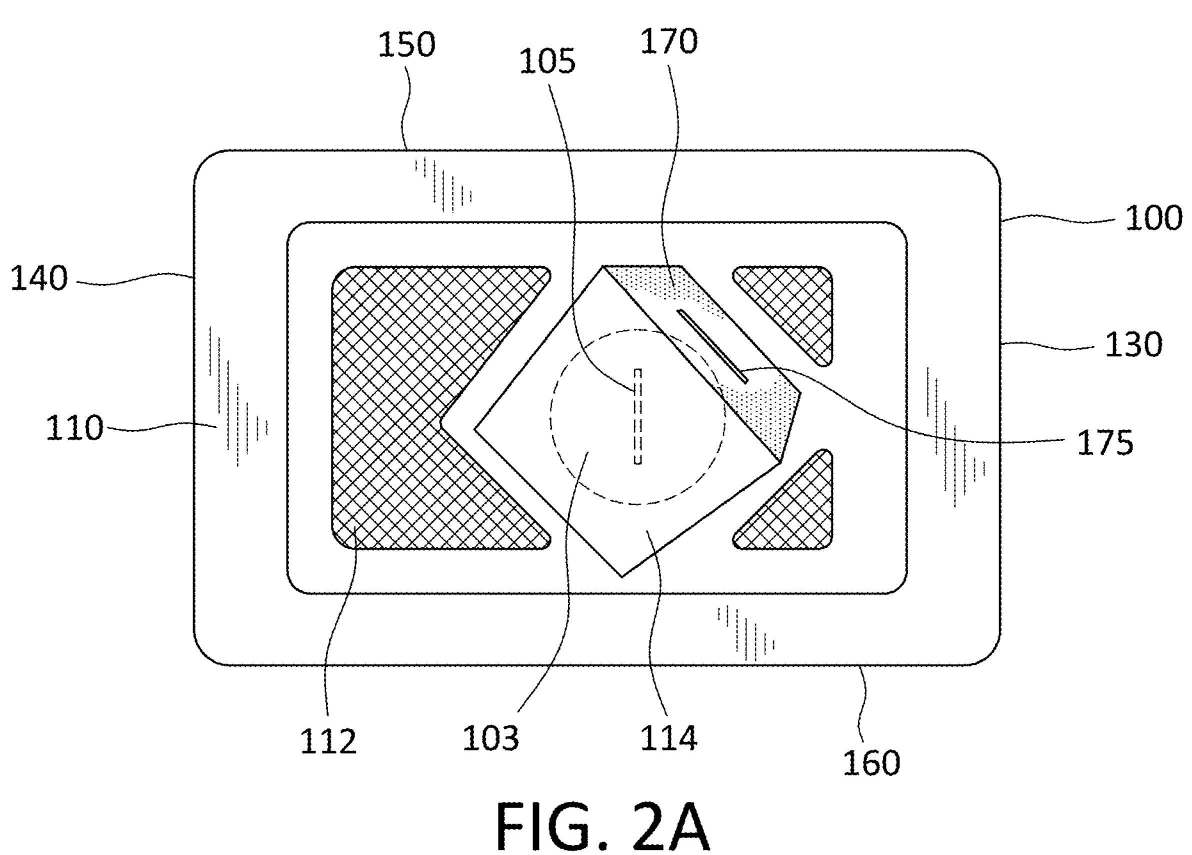
FIG. 2A shows a side view of the pet carrier of the embodiment of FIG. 1B.

FIG. 2A shows a side view of the pet carrier of the embodiment of FIG. 1B with panel 114 in the open position; accordingly, second opening 175 and collapsible barrier 170 are visible. Section 103 and first opening 105 are shown in phantom.

Figure 2B:
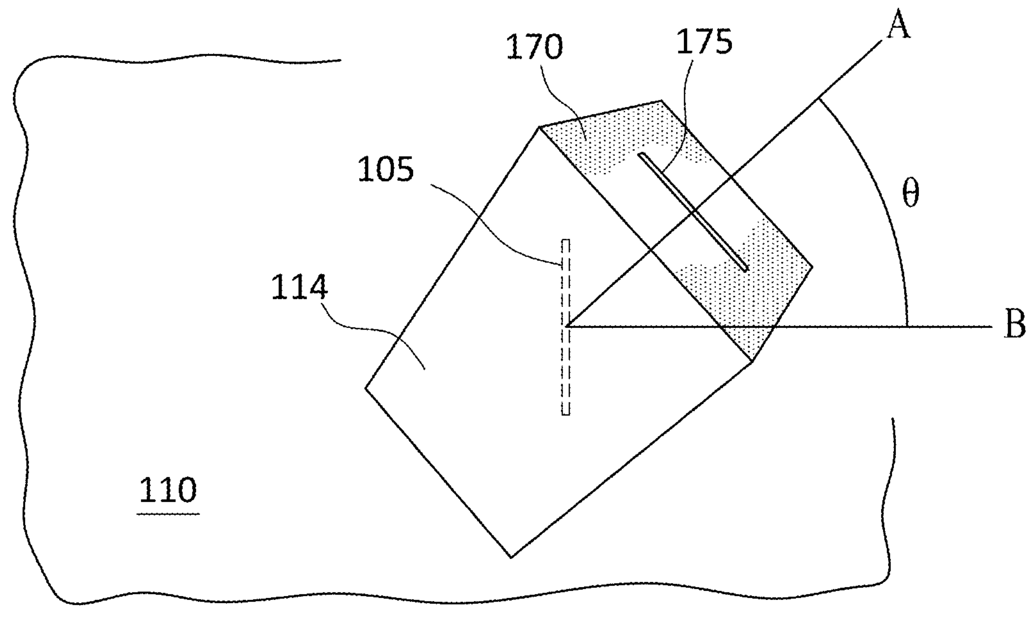
FIG. 2B shows a side of a pet carrier and a panel in the open position in accordance with an embodiment.

In accordance with one or more embodiments, when carrier 100 rests on a flat surface such as a floor or a table top, panel 114 has an orientation defined by an angle between (1) a first line that passes through the center of first opening 105 and the center of second opening 175 and (2) a second, horizontal line that is parallel to a plane defined by the flat surface on which the carrier rests. FIG. 2B shows a side of a pet carrier and panel 114 in accordance with an embodiment. Panel 114 is in the open position; accordingly, second opening 175 and collapsible barrier 170 are visible. First opening 105 is shown in phantom. A first line A passes through the center of first opening 105 and through the center of second opening 175. A second line B is a horizontal line. Thus, for example, line B is parallel to the plane formed by a (flat) floor when pet carrier 100 rests on the (flat) floor, or is parallel to the plane formed by the surface of a (flat) tabletop when carrier 100 rests on the tabletop. As shown in FIG. 2B, the intersection of line A and line B defines an angle theta ($\theta$).

In various embodiments, the angle theta ($\theta$) may be any angle between zero (0) and one hundred eighty (180) degrees. Preferably, the angle theta ($\theta$) is an angle between fifteen (15) and sixty (60) degrees. Such angling both mirrors the human elbow—forearm physiology and creates vertical displacement in the channel that further limits the risk of escape. Other angles may be used.

Figure 3:
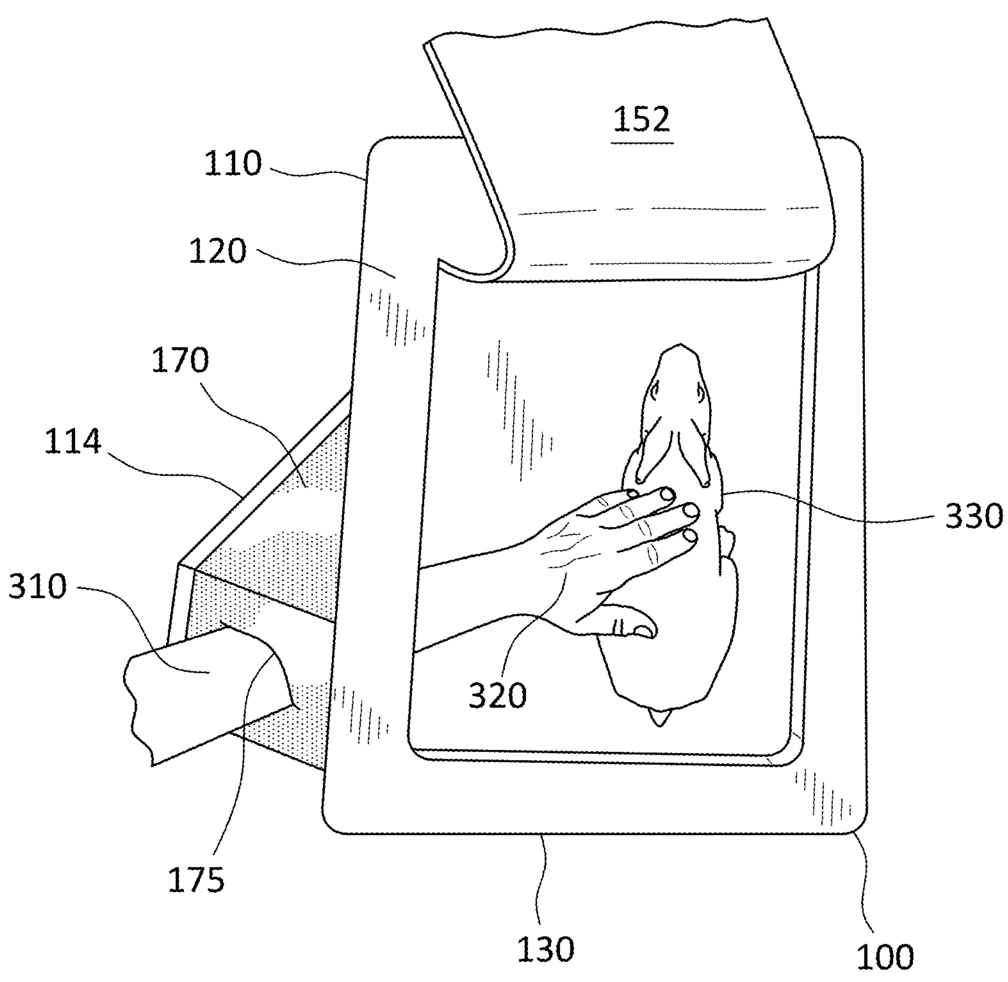
FIG. 3 shows a top view of a pet carrier in accordance with an embodiment.

FIG. 3 shows a top view of pet carrier 100 while in use in accordance with an embodiment. Panel 114 is in the open position exposing second opening 175, forming the enclosed volume 180 (not shown in FIG. 3) between panel 114, collapsible barrier 170, and first side 110, and providing access to first opening 105 (not shown in FIG. 3). For purposes of illustration, top door 152 is shown in an open position, showing an animal 330 inside the carrier. A user's arm is inserted through second opening 175 and through first opening 105 (not shown), and the user's hand is able to contact animal 330.

Thus, in accordance with one or more embodiments, a pet carrier includes a body adapted to hold one or more animals, the body having at least a bottom, a first side, a second side opposite the first side, a first end, and a second end opposite the first end, a first opening located on the first side adapted to enable a hand of a user to be inserted into an interior of the body, and a structure covering the first opening. The structure includes a panel formed of a first material, the panel having a plurality of edges, wherein at least a first edge among the plurality of edges is attached to the first side of the body and one or more second edges among the plurality of edges are not connected to the first side of the body. The structure also includes a collapsible barrier formed of a second material different from the first material, the collapsible barrier being attached to the one or more second edges of the panel and attached to the first side of the body, the collapsible barrier extending between the one or more second edges and the first side of the body. A second opening is located in the second material of the collapsible barrier. The second opening may be vertically displaced by a first distance relative to first opening and horizontally displaced by a second distance relative to the second opening. An intersection of a first line passing between a first center of the first opening and a second center of the second opening when the panel is in the open position and a second, horizontal line forms a second angle between fifteen (15) degrees and sixty (60) degrees. The panel has a closed position in which (a) the panel covers the first opening, and the collapsible barrier is in a folded position, and an open position in which the panel is disposed at a non-zero angle relative to the first side of the body and the collapsible barrier is in an extended position. An enclosed volume is formed by the first side of the body, the panel, and the collapsible barrier when the panel is in the open position. The second opening is adapted to enable the hand of the user to be inserted from an exterior of the body into the enclosed volume when the panel is in the open position.

Advantageously, the inventive pet carrier disclosed herein provides numerous benefits for both the owner and the pet. For owners, the experience of having convenient, comfortable access to the pet during travel reduces stress because (1) contact with a pet lowers cortisol levels and reduces anxiety (especially for people with emotional support animals), and (2) the owner's knowledge that he or she can tend to their pet can distract the owner's mind from the stress and anxiety associated with travel. Additionally, the pet carrier disclosed herein allows a pet owner (i) to monitor the pet's heartbeat, which is a stress level indicator and (ii) to administer treats (potentially containing medicine) or otherwise assist the animal—thereby providing the owner comfort in knowing that their pet is safe and comfortable, and that they are doing all they can to make the experience more positive. The inventive pet carrier also allows the owner to access the pet without risk of the pet escaping, and further allows such access without risking negative interactions with neighbors in transit who may be upset were the owner to take their animal out of the carrier entirely. Furthermore, because of the features of the disclosed pet carrier, the pet may be more inclined to enter the carrier because instead of solely negative associations, the pet may come to associate the pet carrier with safety and comfort. The aforementioned benefits, taken as a whole, make it more likely that people will take their pets with them when traveling, eliminating or minimizing the costs associated with pet sitters or kennels, and increasing opportunities to make memories with their pets.

The inventive carrier also provides advantages for the pets. The fact that the owner has convenient, comfortable access to the pet during travel tends to reduce any stressful experiences for pets because the easy access allows for persistent, comforting contact—not just a quick pat on the head. This is key for attachment formation and generally preferred by social creatures like cats and dogs. The location of the inner access opening positions the human hand right on the torso of a curled-up animal, providing a particularly supportive form of contact. The multiple layers of entry minimize the entry of stressful stimuli such as the sights and sounds of public transportation. Instead, the pet will primarily perceive the owner's hand (smell and touch). Due to the safety and security felt by the contemplated contact, the pet will have an easier time falling asleep or otherwise becoming comfortable. Because the pet does not perceive a clear path to escape, the animal may not be as stressed by attempting and failing to do so. Pets prefer to be with their humans, so if any owner is more likely to take their pet with them when traveling, that animal may be happier for having been able to join. This is especially the case if the carrier facilitates the formation of positive—instead of the more pervasive negative—associations with entry into their carrier. The sight of a carrier is often stressful for animals too who know it may foreshadow an unpleasant experience. Instead, the promise of contact with the owner may increase the likelihood of the pet's willing entry into the carrier.

A variety of mechanisms may be used to attach a panel to a side of a pet carrier. For example, in accordance with an embodiment, a panel may be attached to a side of a pet carrier by a mechanism that allows the panel to be opened and held at a selected angle relative to the side of the carrier. In another embodiment, a panel may be attached to the side of a pet carrier by a mechanism that allows a user to open the panel with a first push and close the panel with a second push.

Other mechanisms may be used to attach a panel to the side of a pet carrier. For example, a panel may be attached to a side of a pet carrier by a spring-loaded hinge, a spring detente mechanism, or any other attachment mechanism that causes the panel to move automatically from a closed position to an open position when released from the closed position.

For example, in some embodiments, a panel is attached to a side of a pet carrier by a hinge. A spring detente mechanism, spring-loaded hinge mechanism, or other similar mechanism may be used to exert a force on the panel that causes the panel to move automatically from the closed position to an open position. In addition, the panel may include a fastening device such as a strip of hook-and-loop material, snap, button, latch, etc., adapted to secure the panel in the closed position. When the fastening device is released, the spring detente mechanism or a spring-loaded hinge mechanism may force the panel from the closed position to the open position, causing the panel to "pop open."

Figure 4:
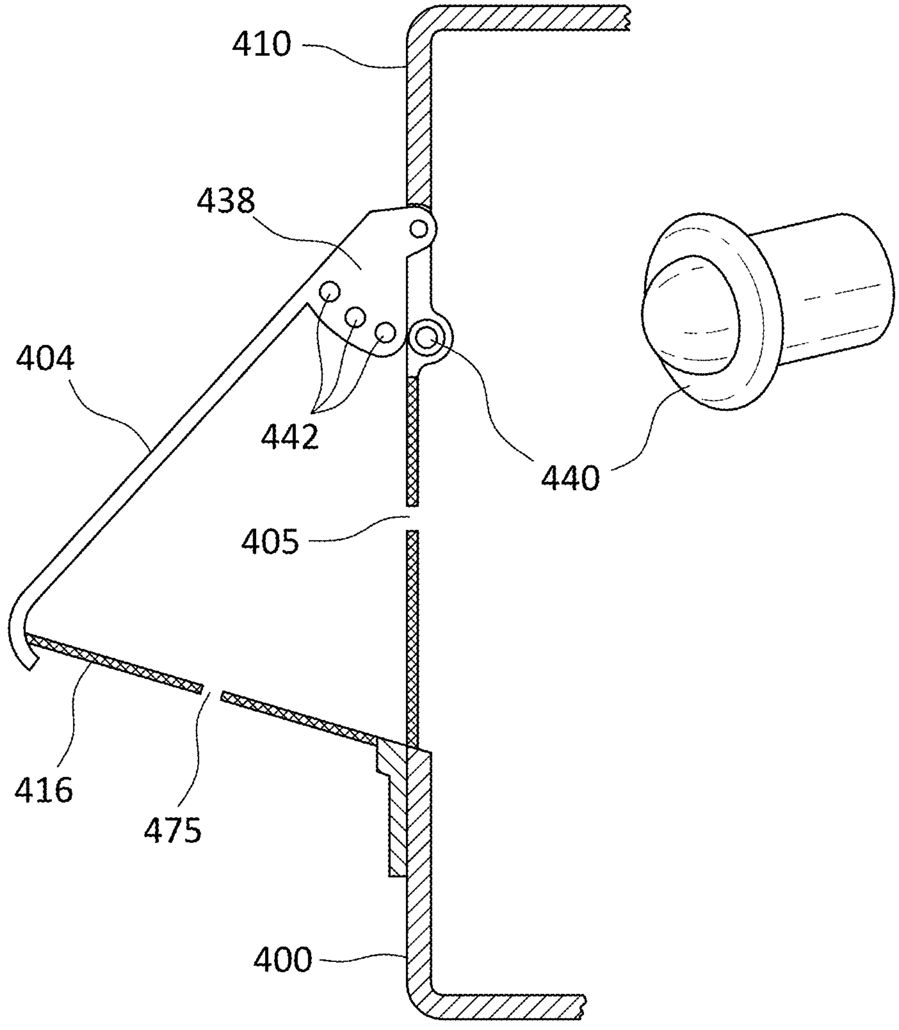
FIG. 4 is a cross-sectional view of a panel attached to the side of a pet carrier in accordance with an embodiment.

In one or more embodiments, a pet carrier includes a panel (similar to panel 114 described above) that can be held open at a variety of different angles relative to the side of the pet carrier. FIG. 4 is a cross-sectional view of a panel attached to the side of a pet carrier in accordance with an embodiment. The pet carrier shown in FIG. 4 includes features similar to the pet carrier of carrier 100 of the embodiments shown in FIGS. 1-3. Thus, a panel 404 is attached to a side 410 of a pet carrier 400. A collapsible barrier 416 is attached to panel 404 and to side 410, forming an enclosed volume between panel 404, collapsible barrier 416, and side 410. A first opening 405 is located in side 410 of pet carrier 400, and a second opening 475 is located in collapsible barrier 416.

Panel 404 is attached to side 410 by a mechanism that allows a user to place panel 404 in an open position at an angle selected from a plurality of available angles. The angle is defined as an angle formed by the intersection of panel 404 and side 410. Panel 404 may rotate on a hinge, pin or similar mechanism. A fixing element 438 is connected to panel 404 and includes a plurality of apertures 442, each aperture corresponding to a respective angle. A spring plunger assembly 440 disposed on side 410 of the carrier is adapted to engage a selected one of the apertures 442 of fixing element 438. Thus, by moving panel 404 to a desired angle and causing the spring plunger to engage with a corresponding aperture 442, a user can adjust the position of panel 404 to a desired open position associated with a selected angle and secure the panel in the desired open position at the selected angle.

In other embodiments, a detente hinge may be used to hold a panel in a fixed position. For example, after the panel is opened to a selected position, a detente hinge may hold the panel in the selected position. In another embodiment, a spring-loaded detente hinge may be used to hold a panel in a fixed position In one or more embodiments, a pet carrier includes a panel that is adapted to open in response to a first push on a particular surface of the panel, and close in response to a second push on the same surface of the panel. For example, a push-to-open push close latch mechanism may be used. In other embodiments, other types of mechanisms may be used.

Figure 5A:
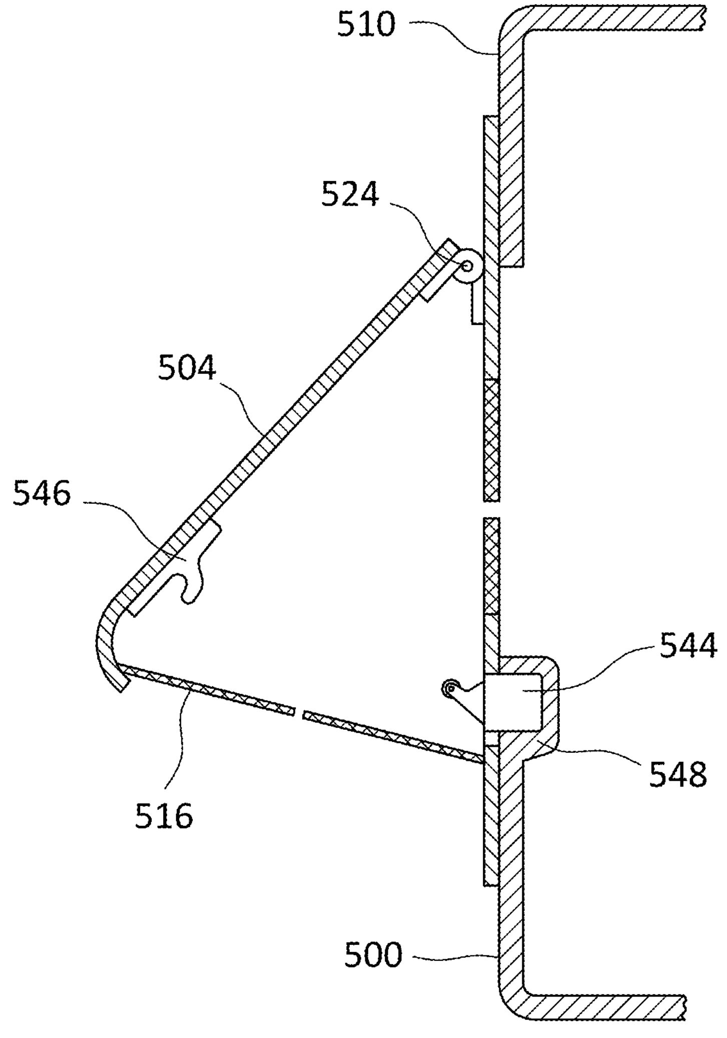
FIG. 5A is a cross-sectional view of a panel attached to the side of a pet carrier in accordance with an embodiment.

FIG. 5A is a cross-sectional view of a panel attached to the side of a pet carrier in accordance with an embodiment. The pet carrier shown in FIG. 5A includes features similar to the pet carrier of carrier 100 of the embodiments shown in FIGS. 1-3. Thus, a panel 504 is attached to a side 510 of a pet carrier 500 by a hinge 524. A collapsible barrier 516 is attached to panel 504 and to side 510, forming an enclosed volume between panel 504, collapsible barrier 516, and side 510. A first opening is located in side 510 of pet carrier 500, and a second opening is located in collapsible barrier 516.

A push-to-open roller latch includes a receiving member 546 attached to panel 504 and a latch device 544 attached to side 510 of carrier 500. In the illustrative embodiment, latch device 544 is disposed in a portion 548 of side 510.

Figure 5B:
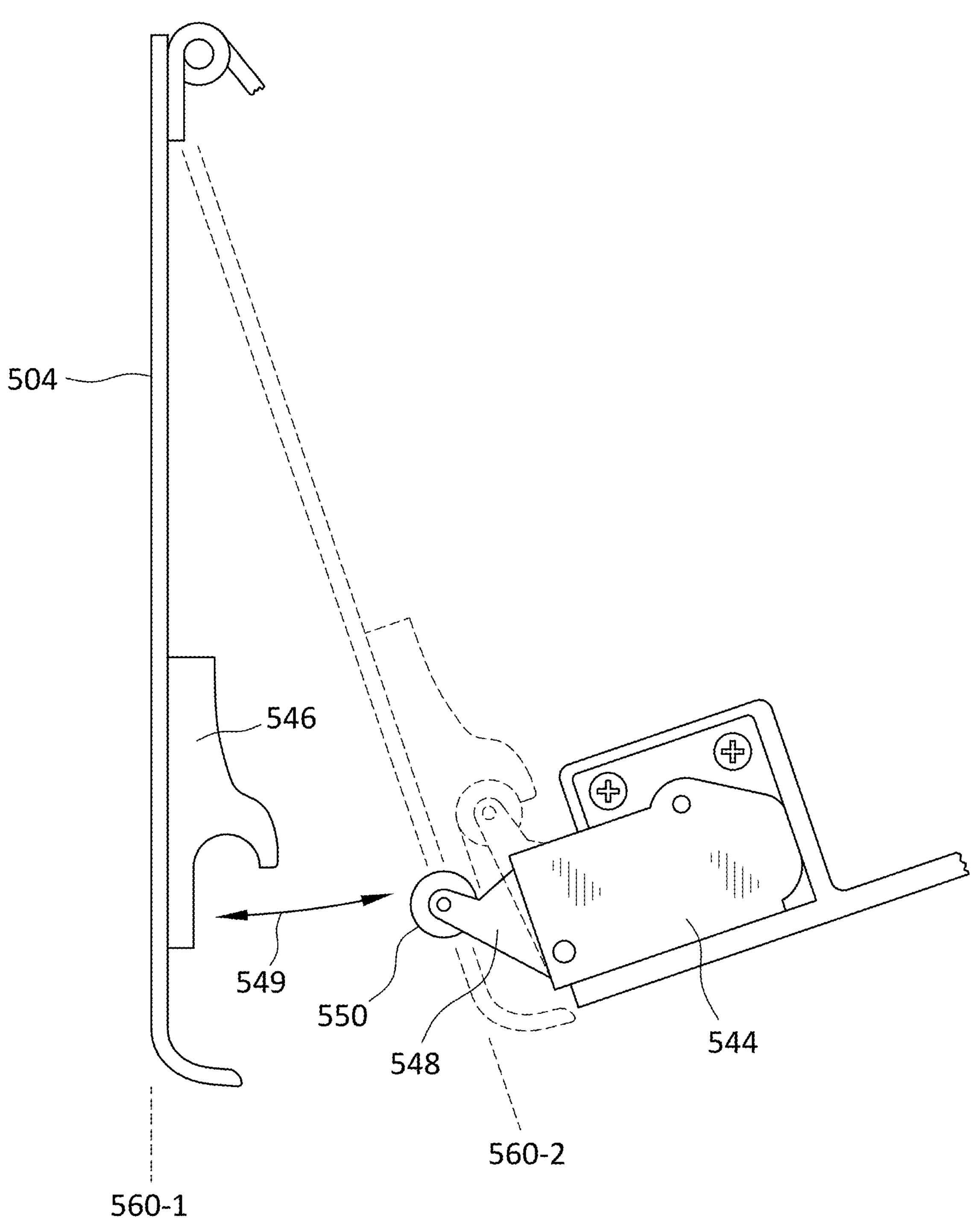
FIG. 5B illustrates the operation of a push-to-open roller latch in accordance with an embodiment.

FIG. 5B illustrates the operation of the push-to-open roller latch in accordance with an embodiment. Latch device 544 includes an arm 548 and a roller 550 disposed on arm 548. Arm 548 and roller 550 have an extended position and a contracted position. Roller 550 is adapted to engage with receiving member 546.

In the illustrative embodiment, when panel 504 is in an open position 560-1, receiving member 546 is not engaged with roller 550. When a user presses panel 504 toward a closed position by pushing on the outer surface of panel 504, force associated with the user's push causes movement of panel 504; the force causes receiving member 546 to engage with roller 550 and also causes arm 548 and roller 550 to move from the extended position to the contracted position. When arm 548 and roller 550 are in the contracted position, arm 548 and roller 550 remain in the contracted position, causing panel 504 to remain in a closed position 560-2.

When roller 550 is in the closed position 560-2, the user may again push on the same outer surface of panel 504 to open the panel. Force associated with the user's push on the closed panel 504 causes arm 548 and roller 550 to move from the contracted position to the extended position, causing receiving member 546 to disengage from roller 550. After receiving member 546 disengages from roller 550, panel 504 returns from closed position 560-2 to open position 560-1.

Thus, panel 504 is adapted to move back and forth from the open position to the closed position in response to a user pushing multiple times on the same surface of panel 504. In FIG. 5B, the movement of panel 504 between open position 560-1 and closed position 560-2 is represented by arrow 549.

In another embodiment, a structure may include both a push-to-open push close mechanism and a fixing element. For example, a panel may include a push-to-open push close latch mechanism such as that shown in the embodiment of FIGS. 5A-5B, and a fixing element such as fixing element 538 of the embodiment of FIG. 4, to enable a user, with a single push motion, to push open a panel and also cause the panel to move to and remain in a first position (e.g., a position corresponding to a first aperture).

In another embodiment, a structure may include both a push-to-open push close mechanism and a detente hinge. For example, a panel may include a push-to-open push close latch mechanism such as that shown in the embodiment of FIGS. 5A-5B, and a detente hinge, to enable a user, with a single push motion, to push open a panel and also cause the panel to move to and remain in a selected position.

Existing pet carriers do not allow a pet owner to safely access their animals in a manner equally comfortable for the user regardless of the user's handedness or angle of access. Some users find it uncomfortable and even challenging to reach into a pet carrier from some angles. The optimal angle that is comfortable for any particular user depends on several factors including the user's handedness (right-handed or left-handed), other physical characteristics of the user, the user's personal preferences, etc. The optimal angle for reaching into a pet carrier at any particular time is also affected by factors such as the user's location relative to the pet carrier, the user's immediate circumstances, how much additional space the user may have to maneuver, etc.

Thus, the preferred angle for entry of a user's hand into a pet carrier is context dependent. For example, if the carrier sits below the owner, a more vertical angle of entry may be more comfortable. If the carrier is placed on a higher platform, such as the owner's lap, a more horizontal angle of entry may be preferable. Equally, if the carrier is positioned lengthwise, rotating the structure so that the opening in the material of the collapsible barrier is oriented towards one end or another may facilitate access. For example, such a configuration may be advantageous in the case of lengthwise placement under an airplane seat in front of the owner.

Advantageously, embodiments of the pet carrier described herein maximize the number of available access points and allows the user to select an angle for accessing the pet carrier. Thus, the pet carrier described herein optimizes the pet owner's comfort as well as the carrier's utility. Pet owners, regardless of whether they are right-handed or left-handed, and regardless of circumstances, can enjoy the benefits of the pet carrier.

In one or more embodiments, a pet carrier includes a first opening on a side, a rotating platform located over the first opening, and, attached to the rotating platform, a structure including a panel, a collapsible barrier extending between the panel and the platform, and a second opening in the collapsible barrier. A user can rotate the structure to a desired angle and then insert a hand through the second and first openings to access the inside of the pet carrier and contact an animal therein.

Figure 6A:
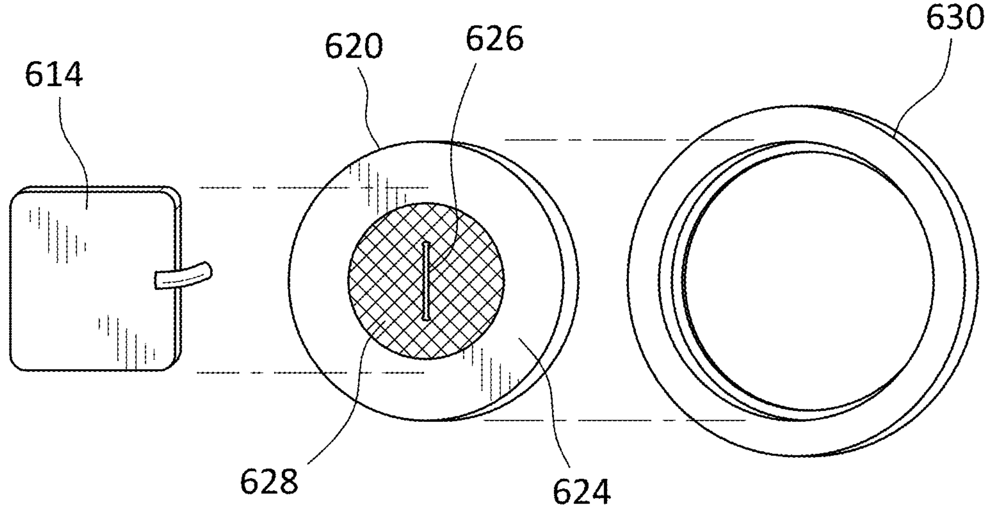
FIG. 6A shows a panel, a ring, and a track element in accordance with an embodiment.

FIG. 6A shows a panel 614, a ring 620, and a track element 630 in accordance with an embodiment. Panel 614 includes features similar to panel 114 of the embodiment of FIG. 1B.

Ring 620 includes an annular element 624, which has a circular shape and may be formed of plastic or other suitable material, and a central circular region. Annular element has an outer circular circumference and an inner circular circumference. The inner circular circumference defines a central region. A material 628 extends across the central region. Material 628 may be formed of plastic, fabric, neoprene, or other suitable material. An opening 626 is disposed in material 628. Opening 626 may be formed in a manner similar to first opening 105 of the embodiment of FIG. 1A. Annular element 624 of ring 620 is adapted to engage with track element 630.

Track element 630 includes a ring-shaped, circular track adapted to receive ring 620 and allow ring 620 to rotate therein. In some embodiments, track element 630 is adapted to allow ring 620 to rotate three hundred sixty (360) degrees without restriction. In other embodiments, track element 630 is adapted to allow ring 620 to rotate only within a limited range. For example, track element 630 may allow ring 620 to rotate within a one hundred eighty (180) degree range. Track element 630 may be formed of plastic or another suitable material.

In accordance with an embodiment, panel 614 may be attached to ring 620 in a manner such that panel 614 covers material 628 and opening 626 within the central region of ring 620. For example, panel 614 may be attached to annular element 624 of ring 620 by a hinge, by any of the attachment mechanisms described herein, or by another mechanism. When panel 614 is attached to ring 620, a collapsible barrier extends from the edges of panel 614 to, and is attached to, ring 620. When panel 614 is attached to ring 620, panel 614 has an open position and a closed position.

Figure 6B:
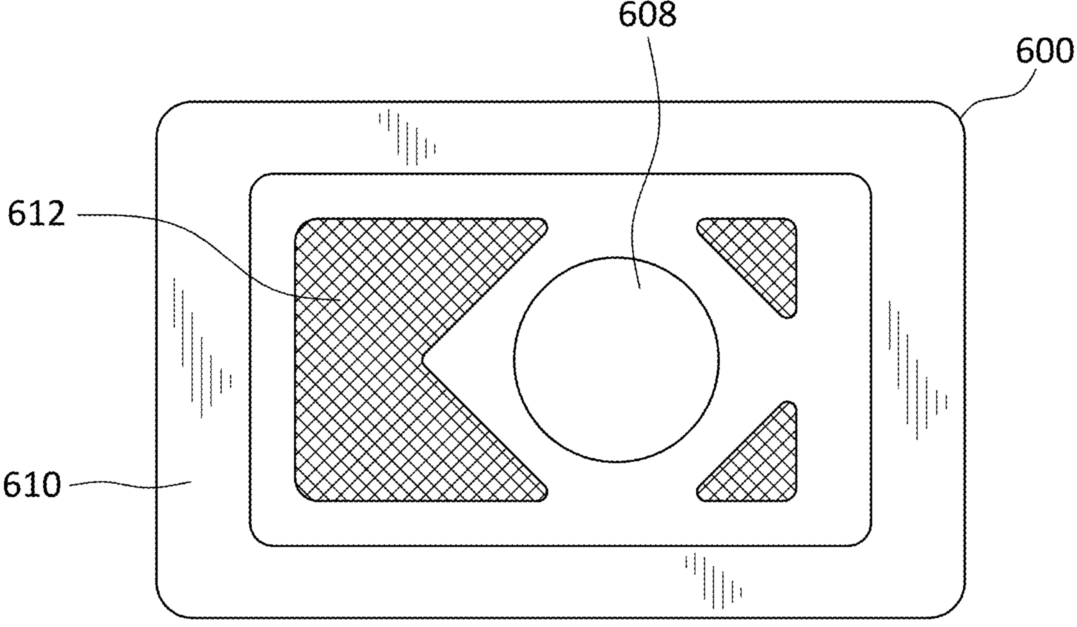
FIG. 6B shows a side of a pet carrier in accordance with an embodiment.
Figure 6C:
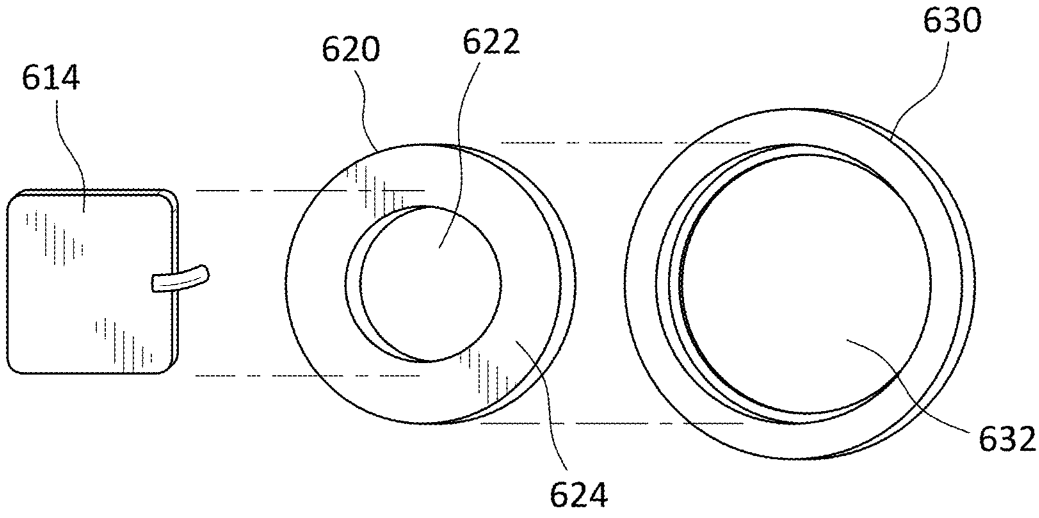
FIG. 6C shows a panel, a ring, and a track element in accordance with another embodiment.
Figure 6D:
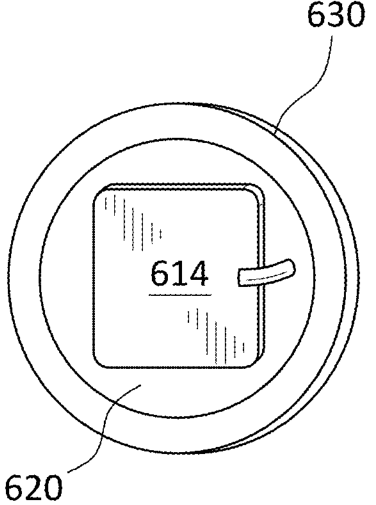
FIG. 6D shows a panel, a ring, and a track element engaged together in accordance with an embodiment.

FIG. 6D shows panel 614 attached to ring 620 and ring 620 engaged in track element 630 in accordance with an embodiment. When panel 614, ring 620, and track element 630 are engaged together in the manner shown in FIG. 6D, ring 620 and track element 630 surround material 628 and opening 626.

FIG. 6B shows a pet carrier 600 in accordance with an embodiment. Pet carrier 600 includes features similar to pet carrier 100 of the embodiment of FIG. 1B, including a first side 610 and a mesh 612. Pet carrier 600 includes a hole 608 located in first side 610. Track element 630 of the embodiment of FIG. 6A may be adapted to be fitted into and be fixedly attached to the edge of hole 608.

In accordance with another embodiment, a pet carrier includes a first side having a first opening similar to that of the embodiment of FIG. 1A or that of the embodiment of FIG. 1H. The first side around the first opening and/or around a section similar to section 103 of the embodiment of FIG. 1A is formed of a selected material such as fabric, plastic, or another suitable material. A track element is attached on top of the selected material in a position surrounding the first opening on the first side of the pet carrier. The track element may be attached the first side of the pet carrier, for example, by stitching, pins, adhesive, or another suitable fastening mechanism. An annular element with a central hole is engaged in the track element. The annular element has no material within the central hole. Thus, the track element and the annular element surround the first opening on the first side of the pet carrier. A structure that includes a panel and a collapsible barrier (with a second opening) is attached to the annular element. When the panel is in an open position, a user can access the first opening on the first side of the pet carrier by inserting a hand through the second opening of the collapsible barrier and through the central hole of the annular element.

FIG. 6C shows panel 614, ring 620, and track element 630 in accordance with an embodiment. Panel 614 may include features similar to panel 114 of the embodiment of FIG. 1B. Ring 620 includes annular element 624 and a central hole 622 (with no material). Central hole 622 may have a size that corresponds to the size of section 103 of carrier 100 of the embodiment of FIG. 1B. Annular element 624 of ring 620 may be formed of plastic or another suitable material. Panel 614 is adapted to be attached to ring 620; when attached to ring 620, panel 614 covers central hole 622. Ring 620 may be engaged in track element 630. Thus, panel 614 may be attached to ring 620, and ring 620 may be engaged with track element 630 in a manner similar to the configuration shown in FIG. 6D.

In accordance with an embodiment, panel 614 may be attached to ring 620, ring 620 may be attached to track element 630, and track element 630 may be fixed to a side of a pet carrier. For example, the combination of parts shown in FIG. 6A may be engaged together and fitted into hole 608 of pet carrier 600 of the embodiment of FIG. 6B. In another embodiment, the combination of parts shown in FIG. 6C may be engaged together and attached to first side of pet carrier 100 of the embodiment of FIG. 1A (over section 103).

Figure 6E:
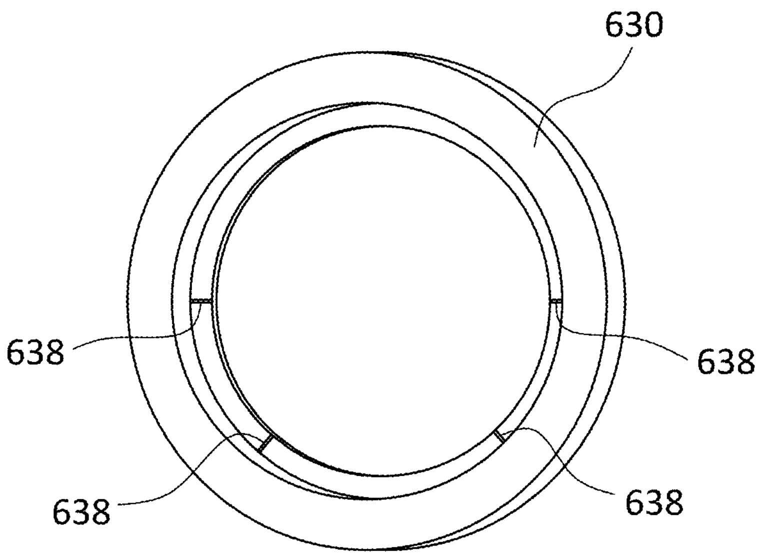
FIG. 6E shows a track element in accordance with an embodiment.

In some embodiments, track element 630 may include one or more structures adapted to stop or limit the rotation of ring 620, or to create a defined space in which ring 620 may be held in a selected position. FIG. 6E shows track element 630 having a plurality of structures 638 in accordance with an embodiment. For example, track element 630 may include one or more stops, pins, grooves, etc. that may guide or limit the rotation of ring 620. Ring 620 may include one or more corresponding structures that engage with the structures in track element 630. In one embodiment, track element 630 includes a plurality of stops within the track, and ring 620 has one or more corresponding structures, that restrict the rotation of ring 620 within a selected range, e.g., within a range of one hundred eighty (180) degrees.

Figure 6F:
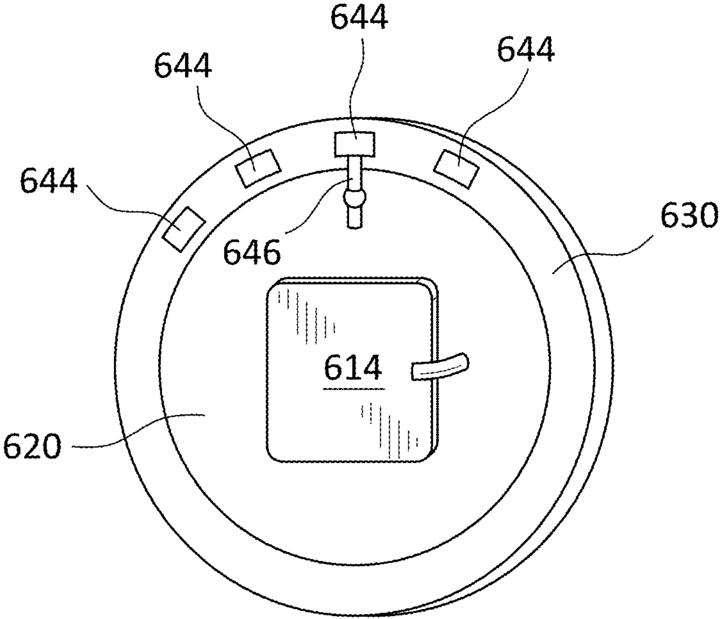
FIG. 6F shows a panel, a ring, and a track element in accordance with an embodiment.

Any suitable fixing mechanism may be used to fix ring 620 (and panel 614) in a selected position within track element 630. FIG. 6F shows a panel, a ring, and a track element in accordance with an embodiment. A slide lock 646 is attached to ring 620 and can fit into any one of a plurality of receiving devices 644 located around the edge of track element 630. When slide lock 646 is engaged in a selected receiving device 644, ring 620 is fixed in a corresponding rotational position. In other embodiments, the slide lock may be attached to track element 630 and the receiving devices may be attached to ring 620.

Figure 6G:
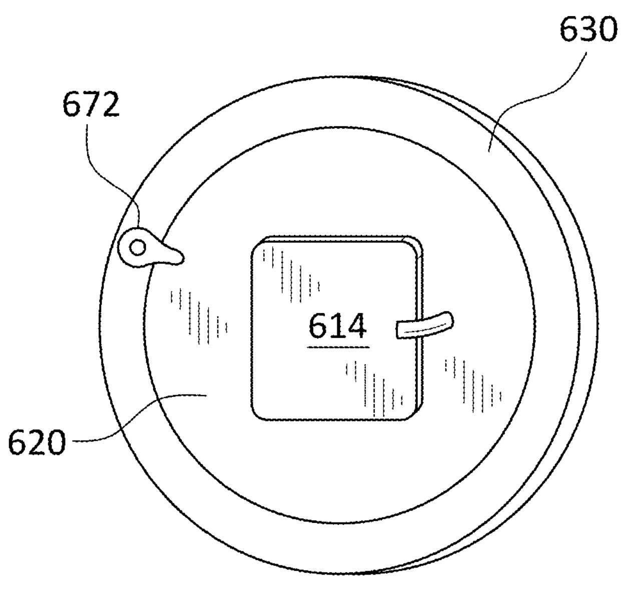
FIG. 6G shows a panel, a ring, and a track element in accordance with another embodiment.

FIG. 6G shows a panel, a ring, and a track element in accordance with another embodiment. A surface level stopper 672 is adapted to rotate (e.g., around a pin) between a first position in which it does not contact ring 620 and a second position in which it contacts ring 620 and fixes ring 620 in a selected rotational position.

Figure 6H:
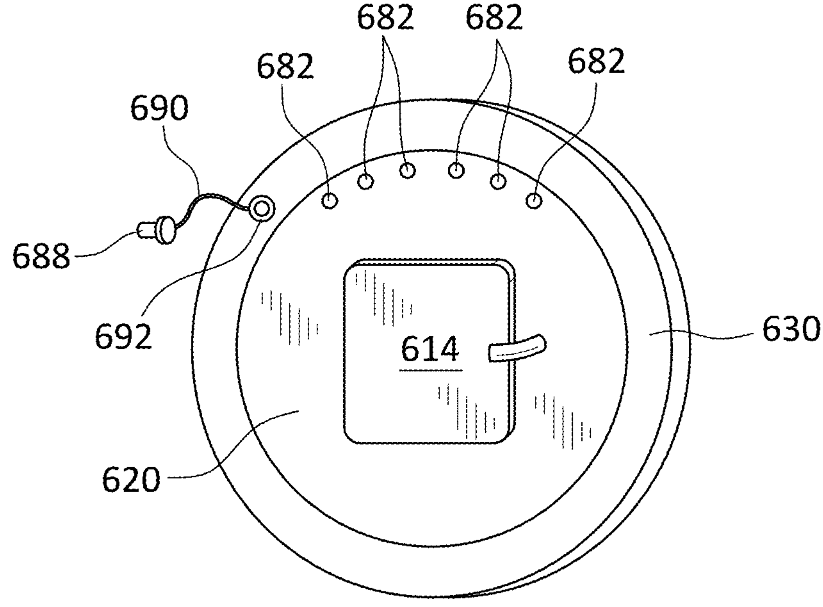
FIG. 6H shows a panel, a ring, and a track element in accordance with another embodiment.

FIG. 6H shows a panel, a ring, and a track element in accordance with another embodiment. A pin lock 688 is attached to a string 690 which is attached to a pin 692. Pin lock 688 is adapted to fit into any one of a plurality of holes 682 disposed in ring 620. When pin lock 688 is placed in a selected hole, ring 620 is fixed in a corresponding rotational position.

In other embodiments, other fixing mechanisms may be used to fix ring 620 in a selected position.

Figure 7:
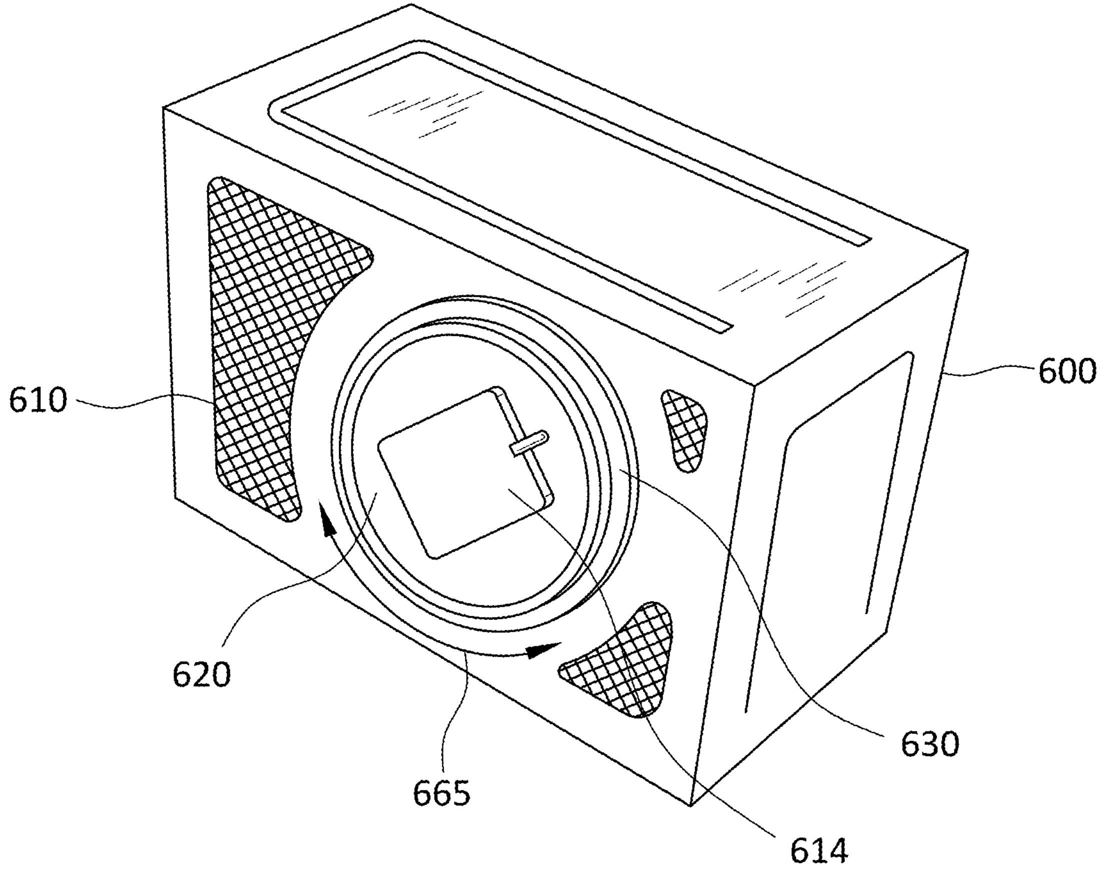
FIG. 7 shows a perspective view of a pet carrier in accordance with an embodiment.

FIG. 7 shows panel 614, ring 620, and track element 630 fixed to a side of pet carrier 600 (of the embodiment of FIG. 6B). More specifically, panel 614, ring 620, and track element 630 are engaged together as described herein, and track element is fixed within hole 608 of carrier 600. Panel 614 and ring 620 can rotate clockwise or counter-clockwise within track element 630, as indicated by double arrow 665.

Figure 8A:
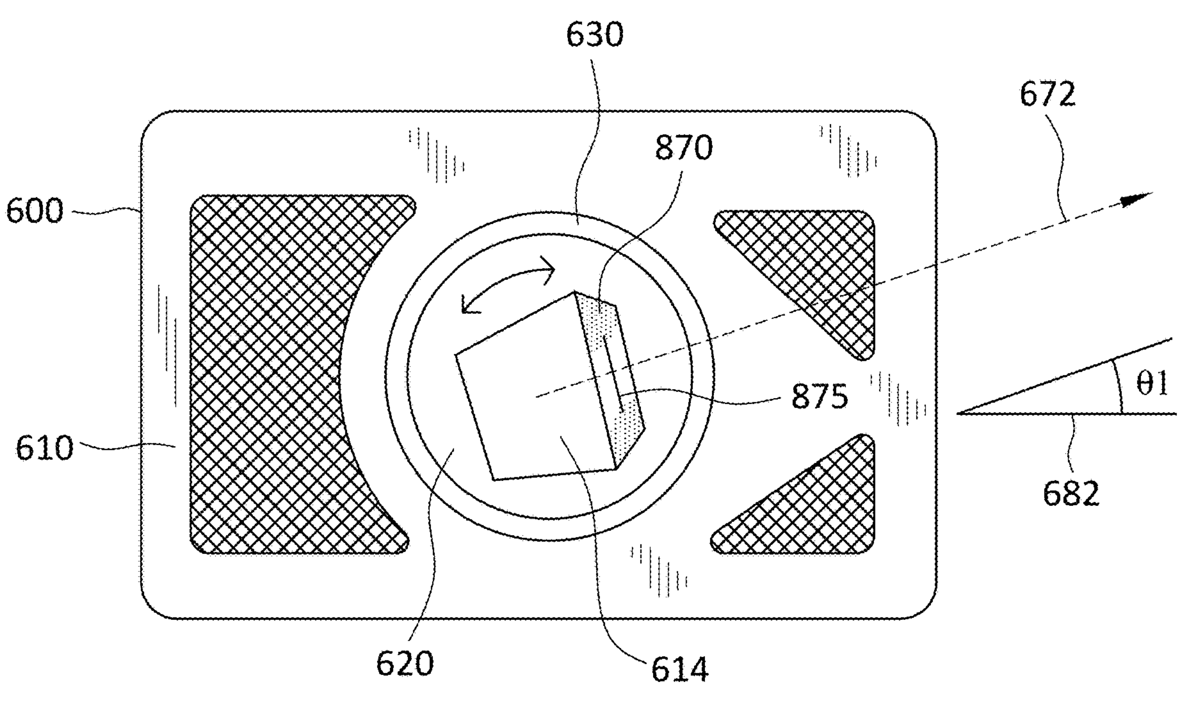
FIG. 8A shows the pet carrier of the embodiment of FIG. 7 with the panel in a first orientation.
Figure 8B:
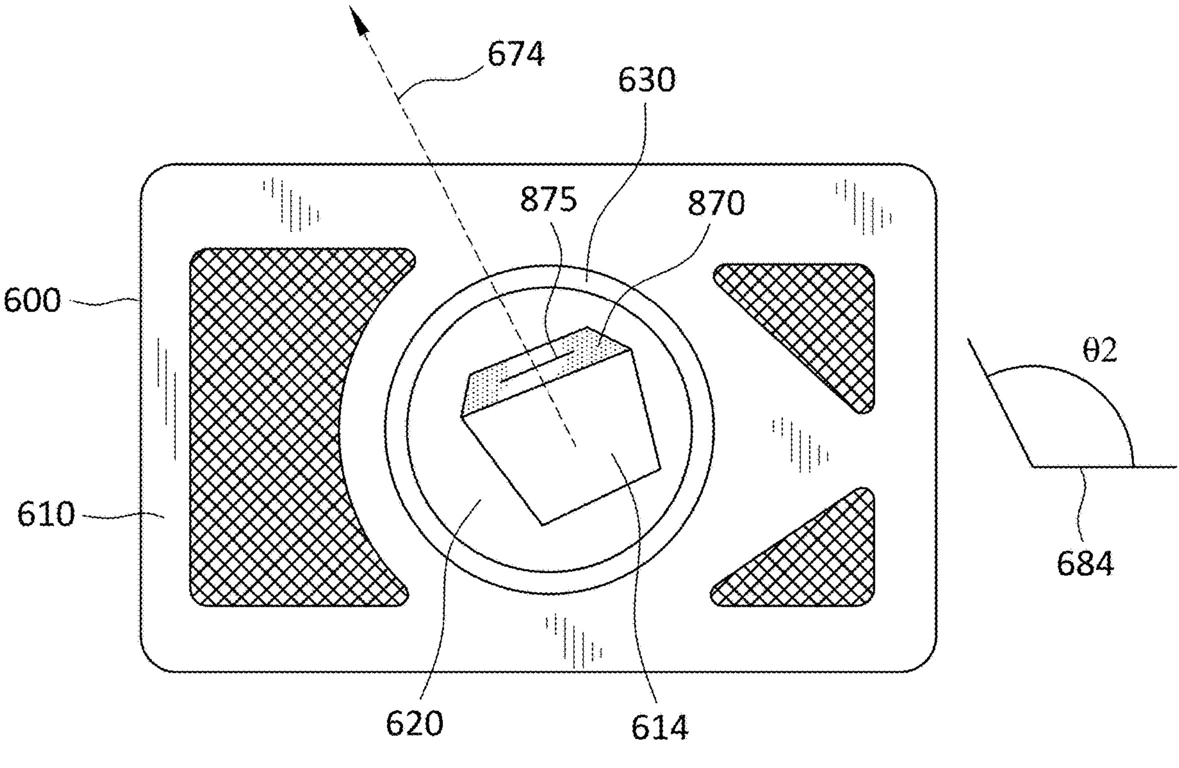
FIG. 8B shows the pet carrier of the embodiment of FIG. 7 with the panel in a second orientation.

In one or more embodiments, panel 614 of the embodiment of FIG. 7 may be opened and rotated to a selected orientation. FIGS. 8A and 8B show pet carrier 600 with panel 614 in several different orientations in accordance with an embodiment. FIG. 8A shows pet carrier 600 with panel 614 in a first orientation and in the open position. Panel 614 is attached to ring 620, ring 620 is engaged in track 630, and track 630 is fixed to side 610 of carrier 600. Panel 614 is in an open position. Collapsible barrier 870 extends between the edges of panel 614 and ring 620. Opening 875 is located in collapsible barrier 870. Panel 614 has a first orientation represented by arrow 672. This orientation corresponds to an angle θ1 defined as the angle between arrow 672 and a horizontal line.

FIG. 8B shows pet carrier 600 with panel 614 in a second orientation and in the open position. Panel 614 has a second orientation represented by arrow 674. This orientation corresponds to an angle θ2 defined as the angle between arrow 674 and a horizontal line.

While two orientations of panel 614 are illustrated in FIGS. 8A and 8B, a user may rotate panel 614 to any selected angle. For example, the user may use a hand to rotate and/or push panel 614 in a desired direction. In response to the force produced by the user's hand, panel 614 and ring 620 rotate within track element 630 to the desired orientation. The user may then insert a hand through opening 875 (shown in FIGS. 8A-8B) and through an opening in side 610 of carrier 600 (not shown in FIGS. 8A-8B) into the interior of carrier 600 and thereby contact an animal within the carrier. In some embodiments, the user may also secure panel 614 in a selected rotational position.

In accordance with another embodiment, a pet carrier includes a side having a hole. The hole may have any shape, for example, rectangular, square, circular, oval, etc. A side piece is adapted to be removably attached to the side of the pet carrier to cover the hole. The side piece may be formed of the same material as the side of the pet carrier. For example, the side piece and/or the pet carrier may include one or more fasteners such as snaps, zippers, pins, hook and look fasteners, one or more tracks, etc., that may be used to attach the side piece to the side of the pet carrier. Thus, a user may conveniently attach the side piece to the carrier or remove the side piece from the carrier. For example, a user may remove a first side piece from the carrier and attach a second side piece to the carrier.

In various embodiments, one or more of the features, devices, structures, and/or elements described herein may be attached to the side piece. For example, the side piece may include a first opening (similar to first opening 105 of the embodiment of FIG. 1A) and a structure that covers the opening. For example, the structure may include a panel and a collapsible barrier extending between edges of the panel and the side piece (similar to panel 114 and collapsible barrier 170 of the embodiment of FIGS. 1B-1G). Alternatively, the side piece may include an opening or a hole, and a structure including a panel, a collapsible barrier, a ring, and a track element (similar to panel 614, ring 620, and track 630 of any of the embodiments of FIGS. 6A-6D) may be attached or fixed to the side piece, covering the opening or hole.

Figure 9:
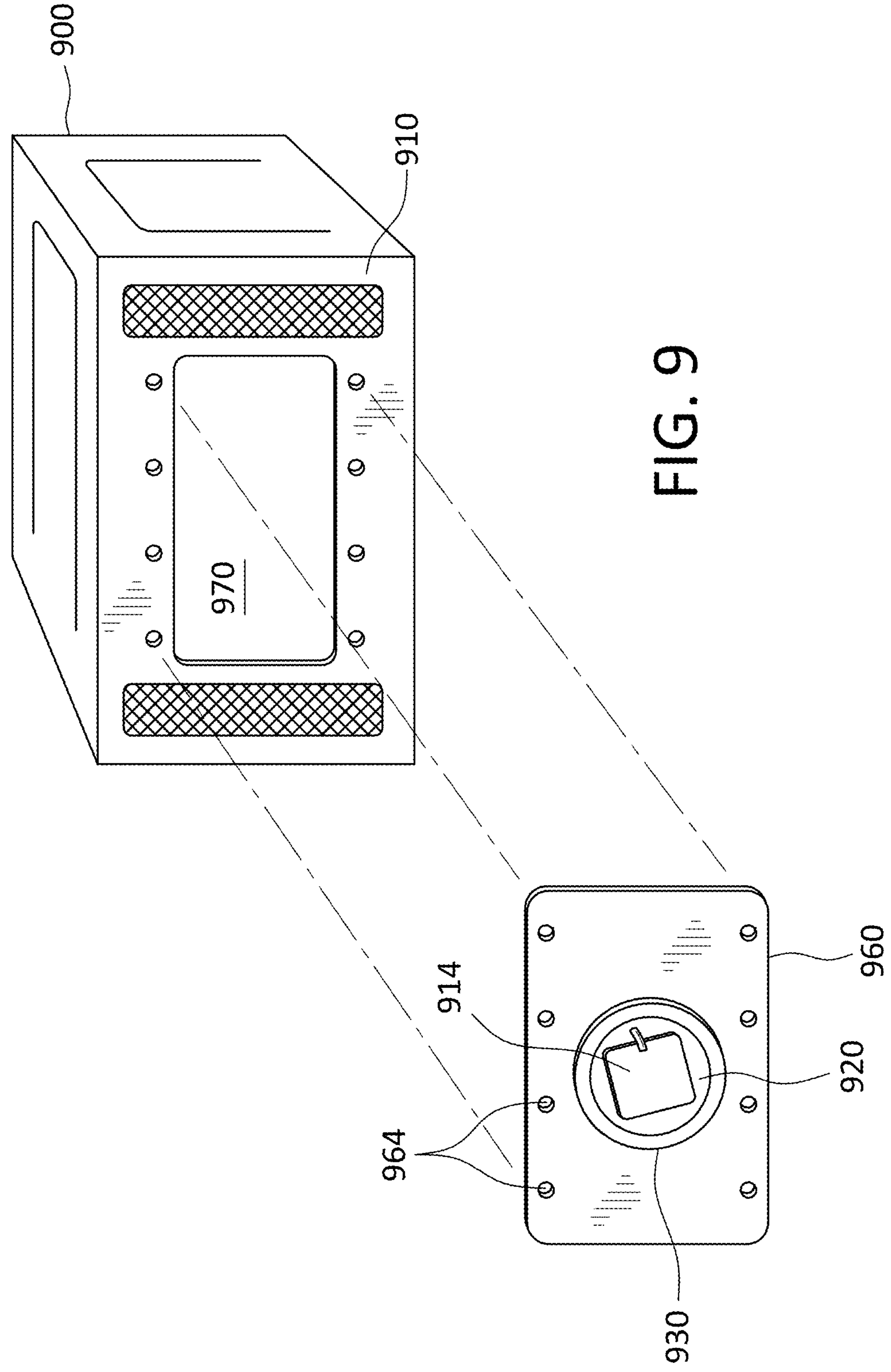
FIG. 9 shows a pet carrier and a side piece in accordance with an embodiment.

FIG. 9 shows a pet carrier and a side piece in accordance with an embodiment. Pet carrier 900 includes a side 910 that has a hole 970. A side piece 960 is adapted to be removably attached to pet carrier 900 and to cover hole 970. Side piece 960 includes fastening devices 964 which may include snaps, pins, or other suitable fastening devices, which may be used to attach side piece 960 to first side 910 of pet carrier 900. Side piece 960 includes a panel 914, a ring 920, and a track element 930, which may include features similar to panel 614, ring 620, and track 630 of any of the embodiments of FIGS. 6A-6D.

Thus, in some embodiments, a user may at a first time attach a first side piece having a first set of features to the pet carrier. Subsequently, at a second time, the user may remove the first side piece and attach a second side piece having a second set of features to the pet carrier.

Thus, in accordance with an embodiment, a pet carrier includes a body adapted to hold one or more animals, the body having at least a bottom, a first side, a second side opposite the first side, a first end, and a second end opposite the first end. The pet carrier also includes a first opening located on the first side adapted to allow passage of a hand of a user into an interior of the body and a structure covering the opening. The structure includes a panel formed of a first material, the panel having a plurality of edges, wherein at least a first edge among the plurality of edges is attached to the first side of the body and one or more second edges among the plurality of edges are not connected to the first side of the body, a collapsible barrier formed of a second material different from the first material, the collapsible barrier being attached to the one or more second edges and attached to the first side of the body, the collapsible barrier extending between the one or more second edges of the panel and the first side of the body, and a second opening located in the collapsible barrier, wherein the second opening is horizontally displaced by a distance relative to the first opening. The panel has a closed position in which the panel covers the first opening, and the collapsible barrier is in a folded position, and an open position in which the panel is disposed at a first non-zero angle relative to the first side of the body and the collapsible barrier is in an extended position. The second opening is adapted to allow passage of the hand of the user from an exterior of the pet carrier to the first opening when the panel is in the open position.

In one or more embodiments, the first material includes at least one of plastic, rubber, wood, or fabric. The second material may include one of neoprene, fabric, rubber, EPDM rubber, silicone, or mesh.

In one or more embodiments, the panel is attached to the first side of the pet carrier by a hinge, one or more buttons, stitching, sew-on snaps, press studs, rivets, or hydraulic or manual cylinders.

In some embodiments, the first side of the pet carrier includes a wire outline, foam, plastic, rubber, or fabric. The first side of the pet carrier includes a section formed of neoprene, fabric, mesh, elastic material, cloth, or synthetic sherpa, and the first opening is disposed in the section.

In one or more embodiments, the second opening is vertically displaced by a second distance relative to first opening. The intersection of a first line passing between a first center of the first opening and a second center of the second opening when the panel is in the open position and a second, horizontal line forms an angle between fifteen (15) degrees and sixty (60) degrees.

In some embodiments, the structure further includes a system having a first device adapted to releasably secure the panel in a closed position, and a second device adapted to cause the panel to move from the closed position to an open position in response to the first device releasing the panel from the closed position.

In another embodiment, the structure further includes a system adapted to cause the panel to move from an open position to a closed position in response to a first force applied to the panel and cause the panel to move from the closed position to an open position in response to a second force applied to the panel.

In one or more embodiments, the system employs a push-to-open roller latch including a receiving element attached to the panel and a latch device attached to the first side of the body, the latch device including a roller adapted to engage with the receiving element. In response to the first force applied to the panel, the roller engages with the receiving element. In response to the second force applied to the panel, the roller disengages from the receiving element.

In another embodiment, the structure further includes a system adapted to enable the panel to move among a closed position and a plurality of open positions, each of the plurality of open positions corresponding to a respective angle formed by the panel and the first side, and to hold the panel in a selected one of the plurality of open positions.

In an embodiment, the system includes a spring plunger disposed on the first side, and an element connected to the panel, the element having a plurality of apertures, each aperture adapted to receive the spring plunger.

In accordance with another embodiment, a pet carrier includes a body adapted to hold one or more animals, the body having at least a bottom, a first side, a second side opposite the first side, a first end, and a second end opposite the first end. The first side includes a first opening adapted to allow passage of a hand of a user into an interior of the body, a track element that surrounds at least a first portion of the first opening, an annular element engaged with and adapted to rotate within the track element, wherein the annular element surrounds at least a second portion of the first opening, and a structure attached to the annular element, wherein the structure covers at least the second portion of the first opening, wherein the structure is adapted to rotate with the annular element. The structure includes a panel formed of a first material, the panel having a plurality of edges, wherein at least a first edge among the plurality of edges is attached to the annular element and one or more second edges among the plurality of edges are not connected to the annular element, a collapsible barrier formed of a second material different from the first material, the collapsible barrier being attached to the one or more second edges of the panel and attached to the annular element, the collapsible barrier extending between the one or more second edges of the panel and the annular element, and a second opening located in the collapsible barrier, wherein the second opening is horizontally displaced by a distance relative to the first opening. The panel has a closed position in which the panel covers the first opening, and the collapsible barrier is in a folded position, and an open position in which the panel is disposed at a first non-zero angle relative to the first side of the body and the collapsible barrier is in an extended position. The second opening is adapted to allow passage of the hand of the user from an exterior of the pet carrier to the first opening when the panel is in the open position.

In one or more embodiments, the annular element includes an inner circumference defining a central region and a third material extending within the central region, and the first opening is located in the third material.

In another embodiment, the first side of the pet carrier is formed from a third material in a region proximate to the track element. The track element is disposed on the third material, and the first opening is formed in the third material.

In some embodiments, the track element includes one or more fixing devices adapted to secure the annular element in a selected rotational position. The one or more fixing devices may include at least one of a slide lock, a pin lock, or a surface level stopper.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A pet carrier comprising:

a body adapted to hold one or more animals, the body comprising at least a bottom, a first side, a second side opposite the first side, a first end, and a second end opposite the first end;

wherein the first side comprises:

a first opening adapted to allow passage of a hand of a user into an interior of the body;

a track element that surrounds at least a first portion of the first opening;

an annular element engaged with and adapted to rotate within the track element, wherein the annular element surrounds at least a second portion of the first opening; and a structure attached to the annular element, wherein the structure covers at least the second portion of the first opening, wherein the structure is adapted to rotate with the annular element, the structure comprising:

a panel formed of a first material, the panel having a plurality of edges, wherein at least a first edge among the plurality of edges is attached to the annular element and one or more second edges among the plurality of edges are not connected to the annular element;

a collapsible barrier formed of a second material different from the first material, the collapsible barrier being attached to the one or more second edges of the panel and attached to the annular element, the collapsible barrier extending between the one or more second edges of the panel and the annular element;

a second opening located in the collapsible barrier, wherein the second opening is horizontally displaced by a distance relative to the first opening;

wherein the panel has:

a closed position in which the panel covers the first opening, and the collapsible barrier is in a folded position; and an open position in which the panel is disposed at a first non-zero angle relative to the first side of the body and the collapsible barrier is in an extended position;

wherein the second opening is adapted to allow passage of the hand of the user from an exterior of the pet carrier to the first opening when the panel is in the open position.

2. The pet carrier of claim 1, wherein:

the annular element comprises an inner circumference defining a central region and a third material extending within the central region; and the first opening is located in the third material.

3. The pet carrier of claim 1, wherein:

the first side of the pet carrier comprises a third material in a region proximate the track element;

the track element is disposed on the third material; and the first opening is formed in the third material.

4. The pet carrier of claim 1, further comprising one or more locking devices adapted to secure the annular element in a selected rotational position.

5. The pet carrier of claim 4, wherein the one or more locking devices include at least one of a slide lock, a pin lock, or a surface level stopper.

6. The pet carrier of claim 1, wherein the first material comprises at least one of plastic, rubber, wood, or fabric.

7. The pet carrier of claim 1, wherein the second material comprises one of neoprene, fabric, rubber, EPDM rubber, silicone, or mesh.

8. The pet carrier of claim 1, wherein the panel is attached to the annular element by one of: a hinge, one or more buttons, stitching, sew-on snaps, press studs, rivets, or hydraulic or manual cylinders.

* * * * *